US011422543B2

(12) United States Patent
Nixon et al.

(10) Patent No.: US 11,422,543 B2
(45) Date of Patent: Aug. 23, 2022

(54) VIRTUALIZED REAL-TIME I/O IN PROCESS CONTROL SYSTEMS

(71) Applicant: FISHER-ROSEMOUNT SYSTEMS, INC., Round Rock, TX (US)

(72) Inventors: Mark J. Nixon, Round Rock, TX (US); Anthony Amaro, Jr., Cedar Park, TX (US); Noel Howard Bell, Austin, TX (US); John M. Caldwell, Austin, TX (US); Gary K. Law, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 181 days.

(21) Appl. No.: 16/874,106

(22) Filed: May 14, 2020

(65) Prior Publication Data
US 2020/0387146 A1    Dec. 10, 2020

Related U.S. Application Data

(60) Provisional application No. 62/859,508, filed on Jun. 10, 2019.

(51) Int. Cl.
*G05B 19/418* (2006.01)
*H04L 67/12* (2022.01)
(Continued)

(52) U.S. Cl.
CPC ... *G05B 19/41885* (2013.01); *G05B 19/4183* (2013.01); *G05B 19/4185* (2013.01);
(Continued)

(58) Field of Classification Search
CPC .......... G05B 19/41885; G05B 19/4183; G05B 19/41835; G05B 19/41845;
(Continued)

(56) References Cited

U.S. PATENT DOCUMENTS

| 8,756,041 B2 | 6/2014 | Maturana et al. |
| 9,256,222 B2 | 2/2016 | Blount et al. |

(Continued)

FOREIGN PATENT DOCUMENTS

| EP | 2 801 940 A1 | 11/2014 |
| GB | 2 429 540 A | 2/2007 |

(Continued)

OTHER PUBLICATIONS

Search Report for Application No. GB2008489.3, dated Feb. 19, 2021.
(Continued)

*Primary Examiner* — Christopher E. Everett
(74) *Attorney, Agent, or Firm* — Marshall, Gerstein & Borun LLP

(57) ABSTRACT

A Multi-Purpose Dynamic Simulation and run-time Control platform includes a virtual process environment coupled to a physical process environment, where components/nodes of the virtual and physical process environments cooperate to dynamically perform run-time process control of an industrial process plant and/or simulations thereof. Virtual components may include virtual run-time nodes and/or simulated nodes. The MPDSC includes an I/O Switch which delivers I/O data between virtual and/or physical nodes, e.g., by using publish/subscribe mechanisms, thereby virtualizing physical I/O process data delivery. Nodes serviced by the I/O Switch may include respective component behavior modules that are unaware as to whether or not they are being utilized on a virtual or physical node. Simulations may be performed in real-time and even in conjunction with run-time operations of the plant, and/or simulations may be manipulated as desired (speed, values, administration, etc.). The platform simultaneously supports simulation and run-time operations and interactions/intersections therebetween.

46 Claims, 6 Drawing Sheets

(51) Int. Cl.
  *G06F 13/40* (2006.01)
  *G06F 9/30* (2018.01)
  *G05B 17/00* (2006.01)

(52) U.S. Cl.
  CPC . *G05B 19/41835* (2013.01); *G05B 19/41845* (2013.01); *G05B 19/41865* (2013.01); *G06F 9/3017* (2013.01); *G06F 13/4022* (2013.01); *H04L 67/12* (2013.01); *G05B 17/00* (2013.01); *G05B 2219/13125* (2013.01); *G05B 2219/13185* (2013.01); *G05B 2219/2214* (2013.01); *G05B 2219/31231* (2013.01); *G05B 2219/32301* (2013.01); *G05B 2219/32343* (2013.01); *G05B 2219/32355* (2013.01); *G05B 2219/32359* (2013.01); *G05B 2219/32407* (2013.01); *G05B 2219/40311* (2013.01)

(58) Field of Classification Search
  CPC .......... G05B 19/4185; G05B 19/41865; G05B 17/00; G05B 2219/13125; G05B 2219/13185; G05B 2219/2214; G05B 2219/31231; G05B 2219/32301; G05B 2219/32343; G05B 2219/32355; G05B 2219/32359; G05B 2219/32407; G05B 2219/40311; G05B 2219/33149; G05B 2219/33139; G06F 9/3017; G06F 13/4022; H04L 67/12; Y02P 90/02; Y02P 90/80
  See application file for complete search history.

(56) References Cited

U.S. PATENT DOCUMENTS

| | | | |
|---|---|---|---|
| 9,304,511 B2 | 4/2016 | Blount et al. | |
| 9,709,978 B2 | 7/2017 | Asenjo et al. | |
| 9,912,737 B2 | 3/2018 | Patin et al. | |
| 9,971,914 B2 | 5/2018 | Maturana et al. | |
| 9,989,958 B2 | 6/2018 | Asenjo et al. | |
| 10,037,443 B2 | 7/2018 | Maturana et al. | |
| 10,372,473 B2 | 8/2019 | Blount et al. | |
| 10,620,613 B2 | 4/2020 | Ong et al. | |
| 2009/0089359 A1* | 4/2009 | Siorek ................ | G05B 19/4186 709/202 |
| 2015/0205280 A1* | 7/2015 | Tsuchiya ............ | G05B 19/0426 700/20 |
| 2017/0017211 A1 | 1/2017 | Periasamy et al. | |
| 2017/0300024 A1 | 10/2017 | Nixon et al. | |
| 2018/0026942 A1* | 1/2018 | De Ligt .................. | H04L 67/42 709/245 |
| 2018/0314240 A1* | 11/2018 | Velagapalli ...... | G05B 19/41835 |
| 2018/0321662 A1 | 11/2018 | Nixon et al. | |
| 2018/0364688 A1 | 12/2018 | Sait et al. | |
| 2019/0101899 A1 | 4/2019 | Enver | |

FOREIGN PATENT DOCUMENTS

| | | |
|---|---|---|
| WO | WO-2012/047654 A1 | 4/2012 |
| WO | WO-2017/223535 A1 | 12/2017 |
| WO | WO-2018/202276 A1 | 11/2018 |
| WO | WO-2018/204225 A1 | 11/2018 |

OTHER PUBLICATIONS

Search Report for Application No. GB2008490.1, dated Dec. 8, 2020.
Search Report for Application No. GB2008491.9, dated Feb. 19, 2021.
Search Report for Application No. GB2008492.7, dated Feb. 19, 2021.
Search Report for Application No. GB2008493.5, dated Feb. 19, 2021.
Search Report for Application No. GB2008494.3, dated Mar. 1, 2021.
Zhang et al., "Hierarchical real-time networked CNC system based on the transparent model of industrial Ethernet," Int J Adv Manul Technol, 34:161-167 (2007).

* cited by examiner

VIRTUALIZED REAL-TIME I/O IN PROCESS CONTROL SYSTEMS

CROSS-REFERENCE TO RELATED APPLICATIONS

This application claims priority to and the benefit of the filing date of U.S. Provisional Patent Application No. 62/859,508, filed on Jun. 10, 2019 and entitled "Industrial Control System Architecture for Real-Time Simulation and Control," the entire disclosure of which is hereby expressly incorporated by reference herein.

TECHNICAL FIELD

This patent application relates generally to industrial and process control systems and, more particularly, to an industrial control system that provides simulation of process control and/or run-time actual process control using virtualized components.

BACKGROUND

Process or industrial control systems, like those used in chemical, petroleum or other industrial process plants to produce physical products from materials, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc., to control one or more processes executing within the process plant or system. Smart field devices, such as the field devices conforming to the well-known FOUNDATION® Fieldbus protocol may also perform control calculations, alarming functions, and other control functions commonly implemented within the controller. The process controllers, which may be centrally located but which may also be located within the plant environment in a distributed manner, receive signals indicative of process measurements made by the field devices and/or other information pertaining to the field devices and execute a controller application that runs, for example, different control modules that make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available from the controllers over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices execute applications that may, for example, enable an engineer to configure portions of the process or an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and to download these process control modules via a data highway to dedicated distributed controllers. Typically, these control modules are made up of communicatively interconnected function blocks, which are objects in an object-oriented programming protocol that perform functions within the control scheme based on inputs thereto and that provide outputs to other function blocks within the control scheme. The configuration application may also allow a configuration designer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of currently known process control plants and process control systems is strongly influenced by limited controller and device memory, communications bandwidth, and controller and device processor capability. For example, in currently known process control system architectures, the use of dynamic and static non-volatile memory in the controller is usually minimized or, at the least, managed carefully. As a result, during system configuration (e.g., a priori), a user or configuration engineer typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, selected data that is to be archived or saved (as indicated by the configuration of the controller) is reported to the workstation or computing device for storage at an appropriate data historian or data silo. The current techniques used to report the data poorly utilizes communication resources and induces excessive controller loading. Additionally, due to the time delays in communication and sampling at the historian or silo, the data collection and time stamping is often out of sync with the actual process.

Similarly, in batch process control systems, to minimize controller memory usage, batch recipes and snapshots of controller configuration typically remain stored at a centralized administrative computing device or location (e.g., at a data silo or historian), and are only transferred to a controller when needed. Such a strategy introduces significant burst loads in the controller and in communications between the workstation or centralized administrative computing device and the controller.

Further, the current architecture of industrial control systems, such as process control systems, is largely hardware driven in that various functions, such as control functions, input/output (I/O) functions, user interface functions, etc. are performed in and are tied to specific pieces of hardware (e.g., user workstations or interface devices, process controllers, safety system controllers, dedicated I/O devices, marshalled I/O devices, field devices, safety logic solvers, etc.) and remain stored in the specific hardware at all times. For example, in current process control systems, interconnections between controllers and I/O devices (e.g., either individual I/O devices, or banks of marshalled I/O devices) are configured based on particular hardware, and consequently, physical I/O relationships are tightly bound, most commonly in a one-to-one manner, e.g., I/O device to controller, another I/O device to another controller, etc. This architectural design limits the resiliency, reliability, availability, responsiveness, and the elasticity of the control system, as these systems are difficult to change or reconfigure quickly, are tightly tied to proprietary hardware used to implement proprietary control software, require hardware redundancy on a device by device basis that can be expensive to implement, and are not easily scalable or able to be upgraded without adding additional hardware that needs to be configured in particular manners, for example, due to size limitations of individual devices such as physical process controllers, particular characteristics and capabilities of I/O devices, etc.

Some attempts at addressing these issues include virtualizing physical controllers; however, controller virtualization has been limited to off-line development and test systems, and has not been widely utilized, if at all, for run-time process control in physical plant and/or production environments. Moreover, both virtualized controllers and physical controllers remain subject to the limitations of physical I/O devices, such as performance, bandwidth, throughput, etc.

SUMMARY

A novel, multi-purpose hardware/software architecture or platform for dynamic simulation and/or run-time production process control that enables an industrial or process control system of an industrial process plant to be more resilient, responsive, and elastic as compared to known industrial or process control systems. More particularly, this novel architecture or platform, to a large extent, decouples the hardware used in the control system from the software that governs the behavior of the hardware, making the system easier to scale, reconfigure, and change, as well as improving overall system reliability, availability, and performance. For ease of discussion, the novel Multi-Purpose Dynamic Simulation and run-time Control platform or architecture is referred to interchangeably herein by the "MPDSC," "the MPDSC platform," "the MPDSC system, or "the MPDSC architecture."

Generally speaking, the MPDSC includes a virtual process environment coupled to a physical process environment, where components of the virtual and physical environments cooperate to perform dynamic simulation and/or run-time (e.g., actual or operational) production process control of the industrial process plant. For run-time process control, the MPDSC platform supports Process Control Systems (PCSs) which may include virtual components, physical components, and/or both virtual and physical components that cooperate to monitor and control batch and/or continuous industrial processes during run-time of the plant. In some arrangements, the MPDSC platform also supports Safety Instrumented Systems (SIS s) which may have both virtual and physical components that cooperate to maintain safe operations and provide failsafe operations of the plant during run-time. Virtual nodes that perform run-time, operational process control and/or related run-time functions (e.g., in conjunction with one or more physical devices or components disposed in the physical environment of the process plant) are referred to herein as "virtual run-time nodes."

The MPDSC platform may additionally or alternatively support a simulation environment or space which may be utilized for control and/or safety system and/or component testing, validation, verification, and/or check out, operator training, case studies, on-going process improvements, etc. For simulation purposes, the MPDSC platform provides virtual nodes that simulate one or more physical devices, modules, or components that are deployable within the physical process environment. Virtual nodes that simulate various devices, modules, and/or components that are deployable in the physical environment of the process plant are referred to herein as "simulated nodes."

The simulation provided by the MPDSC platform is "dynamic," as simulations of the process plant or portions thereof may execute in real-time, thereby mirroring the timing and other behaviors that (would) occur during run-time, and/or simulations may be manipulated to execute at a faster or slower pace than real-time execution, to use different values, initial conditions, intermediate conditions, etc. The simulation space provides various features such as, for example, save/restore capabilities for various simulated scenarios, editable initial and/or intermediate conditions for various scenarios, coordination with third-party simulators via various protocols, testing and checkout of operator display views, real-time simulation of one or more portions of the PCS, speed-up and/or slow-down of the simulation of the one or more portions of the PCS, simulations that include simulated components operating in conjunction with actual (e.g., non-simulated) virtual and/or physical components, change management and synchronization with plant configuration, etc. The MPDSC platform is able to simultaneously support both simulation and run-time operations, various interactions and intersections between simulation and run-time operations (e.g., testing of upgrades, patches, "what-if" scenarios, configuration changes, user input changes, and the like. Further, with the MPDSC platform, system redundancy, fault tolerance, switchovers, planned maintenance, etc. are able to be seamlessly and easily accomplished.

One of the key components of the MPDSC architecture is referred to herein as an "I/O Switch" or an "I/O Server," which generally abstracts I/O of the process plant away from being specifically and directly associated with particular hardware, as well as performs other functions related to I/O for simulation and/or run-time process control. The I/O Switch or I/O Server is a node that, during run-time, delivers I/O data between virtual and/or physical nodes of the process plant. Each node (whether virtual or physical) is typically a component of the process plant that is identified within the MPDSC system by a unique name, tag, or identifier. For example, a node may be a physical or virtual controller, a field device, a safety information controller, a safety logic solver, an I/O card or device (e.g., a wireless I/O device, an Ethernet I/O device, a marshalled I/O cabinet or components thereof, etc.), an operator workstation, another type of user interface device, a tool (e.g., diagnostic tool, simulation tool, etc.), a gateway, a data storage device, or other type of component. Generally speaking, the I/O Switch operates as a data broker between virtual and/or physical nodes, where the I/O Switch delivers or switches I/O data (also referred to interchangeably herein as "process I/O data," or "PIO data") between source nodes (whether virtual or physical) and destination nodes (whether virtual or physical). In a sense, rather than tightly and/or specifically coupling physical I/O cards to different source and destination nodes to deliver process I/O, the I/O Switch virtualizes the physical delivery mechanisms of process I/O data between nodes of the MPDSC system, and loosens the bindings between hardware components that are utilized for the purposes of delivering I/O data. Moreover, the I/O Switch is configured to be able to deliver I/O data quickly enough (e.g., with sufficiently small delay) to support run-time, actual production process control and/or real-time simulation of production process control.

Generally speaking, virtual and physical nodes/components that are serviced by the I/O Switch or I/O Server include respective modules that govern the behavior of virtual and physical nodes or components. Such modules are referred to herein as "component behavior modules" or "CBMs," examples of which include control modules in controllers, safety logic in safety logic solvers, and other types of modules that govern the behavior and operations of the components in which the modules are stored and executed, and at least in part by operating on I/O data. Within the MPDSC system, CBMs that operate on the process-related payload of the I/O data are agnostic or unaware of the I/O Switch and its role in delivering I/O data to/from the component behavior modules. That is, the CBMs are unaware of whether or not their respective I/O delivery mechanism to/from their host node is a physical I/O card or the I/O Switch.

As such, the I/O Switch may be viewed as a switching fabric, router, and/or delivery mechanism of I/O data that is transparent to Component Behavior Modules of the MPDSC system. To this end, the I/O Switch delivers I/O data between virtual and/or physical nodes via respective publish/subscribe layers of the nodes (also referred to interchangeably herein as a "Pub/Sub layer") and a virtual communication network via which I/O payload or data is transferred between nodes. For example, a sending or publishing node may include a respective Pub/Sub layer that publishes, to the virtual communication network, data generated by the component behavior module of the sending node. The I/O Switch may deliver or switch the published data to nodes that are receivers of or subscribers to the data, and each subscriber node may recover the data via its respective Pub/Sub layer for consumption by its respective component behavior module. As such, the I/O Switch brokers data between publisher nodes and subscriber nodes on a demand basis, in accordance with the defined relationships of the nodes within the MPDSC system.

As utilized herein, the "physical environment" of the MPDSC platform or system refers to the production plant or environment in which physical, tangible components (e.g., field devices, tanks, valves, actuators, heaters, evaporators, sensors, etc.) are utilized to transform, via run-time controlled processes, physical materials into physical products. Accordingly, the "physical environment" is interchangeably referred to herein as the "plant environment" of the industrial process plant. As discussed above, the physical or plant environment includes a front-end portion in which physical or hardware components of the MPDSC system such as field devices, sensors, transmitters, switches, positioners, tanks, heaters, etc. are disposed and operate on physical materials to produce physical products. As such, the "front-end" portion of the physical environment is interchangeably referred to herein as the "field" or "site" portion of the physical environment of the process plant.

The physical or plant environment of the MPDSC system also includes a back-end portion in which physical or hardware components such as operator workstations, personal computers or computing devices, data historians, report generators, centralized databases, and/or other centralized (or at least partly centralized) administrative computing devices execute applications to, for example, configure the process plant and/or its components, view and monitor run-time operations of the plant, respond to alerts or alarms during run-time operations of the plant, adjust parameters during run-time operations of the plant, generate reports, store and analyze data, and the like. The back-end portion of the physical environment of the MPDSC system may be located in areas that are protected from the harsher field environment, such as in an on-site, enclosed room and/or in locations that are off-site or remote from the field environment.

The virtual environment of the MPDSC system is implemented using physical or hardware computing devices that are particularly configured and interconnected to provide a platform that supports the virtualization of various physical process plant components, as is described in more detail in later sections of this disclosure. Generally speaking, the physical computing devices that provide and support the virtualization platform may be physically located on-site at the plant (e.g., in protected, enclosed areas of the field environment), may be physically located off-site, or may be physically and distributively located among various on-site and off-site locations. The physical computing devices that provide and support the virtualization platform may be interconnected via any number of physical data links and/or or communication/data networks. Generally speaking, the physical computing devices, data links, and communication/data networks form a computing platform on which various logical or virtual components of the MPDSC system reside, where the various logical or virtual components may be utilized for run-time process control in conjunction with components of the physical process environment, and/or for process simulation purposes.

The logical or virtual components residing in the virtual environment of the MPDSC system may operate to provide simulation of one or more actual or planned physical portions of the MPDSC system (e.g., in real-time, at faster speeds, and/or at slower speeds, if desired). In some implementations, the logical or virtual components residing in the virtual environment of the MPDSC system and the physical components residing in the physical environment of the MPDSC system may cooperatively operate to provide simulation and/or run-time, actual production process control. As such, in some embodiments, the physical and virtual environments of the MPDSC platform are communicatively connected via one or more communication links and/or networks, where the communication links and/or networks may include any number of wired links and/or networks, wireless links and/or networks, private links and/or networks, public links and/or networks. Embodiments of stand-alone, virtual real-time simulation and embodiments of cooperation between the logical/virtual and physical components of the industrial control system and communicative connections therebetween are described in more detail in later sections of this disclosure.

Further, the virtual and physical environments of the MPDSC platform utilize or share a common (e.g., the same) system configuration database, which is referred to herein as the "MPDSC system configuration database." As such, via the MPDSC system configuration database, various virtual and physical components may be uniquely identified within the MPDSC platform across both virtual and physical environments, and intersections between simulation and run-time operations (e.g., testing, switchovers, etc.) are able to be seamlessly and easily accomplished.

In an embodiment, a method of controlling an industrial process of an industrial process plant includes virtualizing, by an I/O switch communicatively disposed between a plurality of nodes of the industrial process plant, at least one physical delivery mechanism of I/O data between the plurality of nodes via publish/subscribe layers corresponding to the plurality of nodes and the I/O switch. The I/O switch is included in a process control system of the industrial process plant, for example. The plurality of nodes includes a field device disposed in a physical environment of the industrial process plant and a process controller, and the field device and the process controller are included in a process control loop of the process control system that executes during run-time operations of the industrial process plant to control at least a portion of the industrial process. The method further includes delivering process I/O data between the field device and the process controller to thereby control the at least the portion of the industrial process, where the delivering of the process I/O data is accomplished by using a virtualized physical delivery mechanism that is provided by the I/O switch and that utilizes the publish/subscribe layers corresponding to the field device, the process controller, and the I/O switch.

In an embodiment, a system comprises an input/output (I/O) switch included in a process control system of the industrial process plant, where the I/O switch communicatively connects a plurality of nodes of the process control system, and the I/O switch virtualizes at least one physical delivery mechanism of I/O data between the plurality of nodes by utilizing publish/subscribe layers corresponding to the plurality of nodes and the I/O switch. The process control system further includes a process control loop comprising a field device disposed in a physical environment of the industrial process plant and a process controller. The field device and the process controller are included in the plurality of nodes communicatively connected via the I/O switch, and the process control loop executes during run-time operations of the industrial process plant to control at least a portion of an industrial process by utilizing a corresponding virtualized physical delivery mechanism provided by the I/O switch to deliver process I/O data between the field device and the controller.

DETAILED DESCRIPTION

Figure 1:
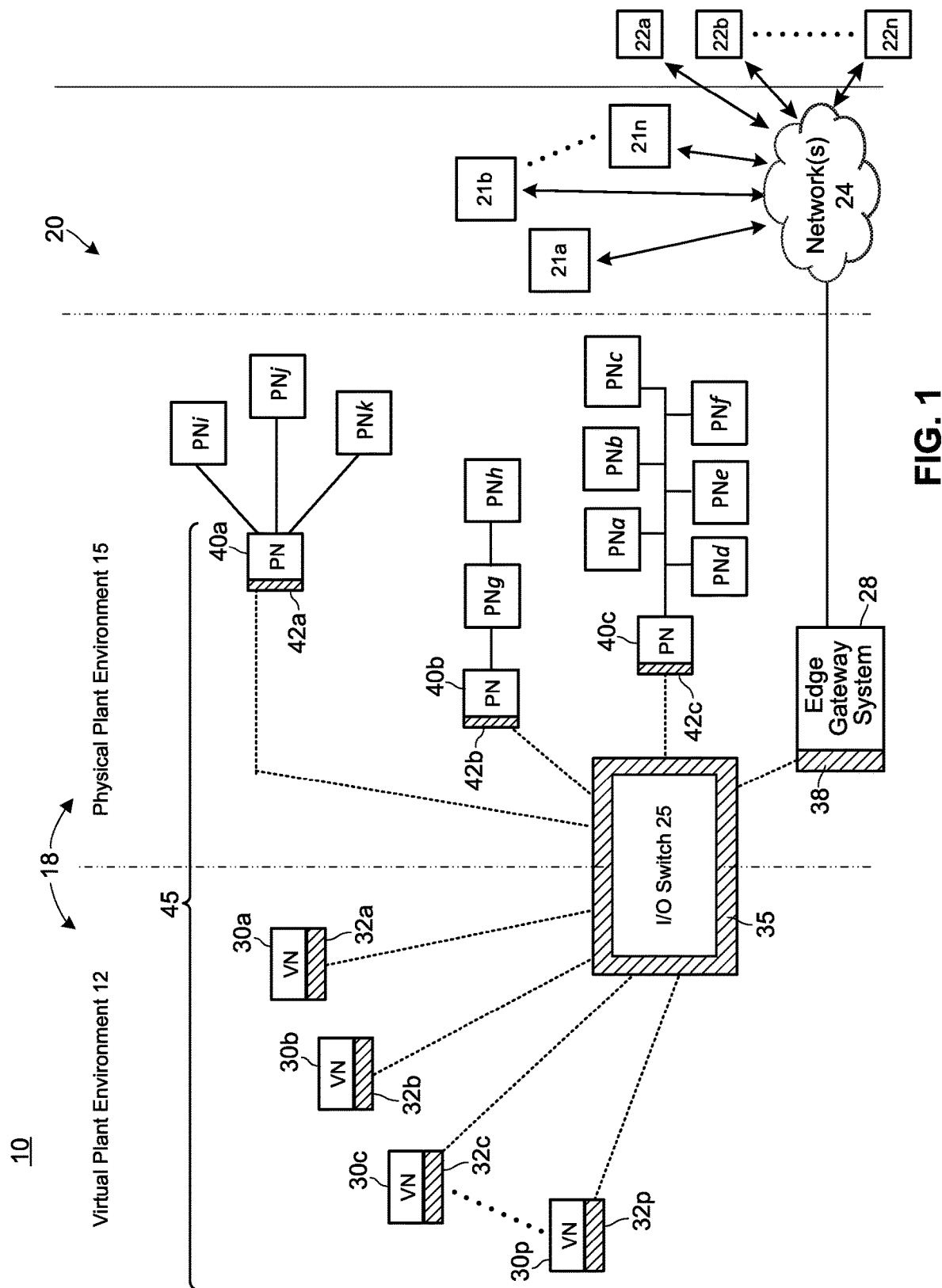
FIG. 1 is a block diagram of an example multi-purpose dynamic simulation and run-time industrial or process control (MPDSC) system that provides dynamic simulation and/or run-time industrial or process control of a process plant.

FIG. 1 is a block diagram of an example multi-purpose dynamic simulation and run-time industrial or process control (MPDSC) system or platform 10 that provides dynamic simulation and/or run-time process control of an industrial or process plant. The example MPDSC platform 10 supports dynamic simulation of process control of the industrial process plant and/or real-time process control using virtualized devices. For example, the virtualized devices may be utilized by the MPDSC platform 10 for physical production purposes during run-time of the process plant. As shown in FIG. 1, the MPDSC platform 10 includes a virtual plant environment portion 12 and a physical plant environment portion 15; however, in embodiments in which the MPDSC platform 10 is utilized solely for real-time simulation purposes, the physical plant environment portion 15 may be omitted. Generally speaking, the virtual plant environment portion 12 and the physical plant environment portion 15 collectively form one or more Operations Technology (OT) layers 18 of the industrial process plant, which may provide generated data to one or more Information Technology (IT) layers 20 associated with the industrial process plant and/or to networks that are external to the IT layers, e.g., for enterprise and/or external use by one or more applications 21a-21n, 22a-22m. For example, applications 21a-21m may be provided by the enterprise that owns/operates the MPDSC platform 10 and may execute in an IT layer associated with the enterprise, and applications 22a-22m may be Internet of Things (IoT) and/or Industrial Internet of Things (IIoT) applications provided by respective third-parties that execute in remote networks which are accessed via the Internet or other public network.

The IT layers 20 of the enterprise may be implemented in any number of locally and/or remotely disposed computing devices, such as one or more local and/or remote server banks, one or more computing clouds, etc., and may include any number of applications or consumers 21a-21n of data generated by the OT layers 18 of the enterprise. Typically (but not necessarily), and as shown in FIG. 1, the OT layers 18 are communicatively coupled to the IT layers 20 via one or more public and/or private communications networks 24 and one or more edge gateway systems 28, where the edge gateway system(s) 28 provide security and efficiencies of data delivery between the OT layers 18/MPDSC platform 10 and the IT layers 20. Further, the one or more edge gateway systems 28 may provide security and efficiencies of data delivery between the MPDSC platform 10 and external networks and/or external applications 22.

In FIG. 1, the virtual plant environment 12 of the MPDSC platform 10 includes one or more Virtual Nodes (VNs) 30a, 30b, 30c, . . . , 30p that are communicatively connected with an I/O Switch (which is interchangeably referred to herein as an "I/O Server") 25. Generally speaking, each Virtual Node 30x is a virtual machine that simulates or virtualizes the behavior of a respective physical component which may be operable within the physical plant environment 15. Said another way, each Virtual Node 30x within the virtual plant environment 12 processes data and behaves in the same manner in which its physical counterpart within the physical plant environment 15 would process data and behave.

In particular, each Virtual Node 30x includes a framework and one or more subsystems 32 that allow the VN 30x to communicate with other Virtual Nodes 30x within the virtual plant environment 12 and/or with one or more Physical Nodes (PNs) within the physical plant environment 15, such as Physical Nodes 40a, 40b, 40c and the Edge Gateway System 28 (where the Edge Gateway 28 may be viewed as a particular type of PN), each of which includes respective frameworks and respective one or more subsystems 42x that allow communications with Virtual Nodes 30x. Additionally, the MPDSC platform 10 may include any number of other physical nodes or components (e.g., PNa-PNk).

Virtual Nodes may virtualize different types of Physical Nodes. Generally speaking, as utilized herein, a "Physical Node" is a physical device or component of the MPDSC platform 10 that includes hardware and that transmits and/or receives data to/from other devices or components (whether virtual or physical). Examples of types Physical Nodes which may be represented by respective Virtual Nodes include, but are not limited to: various types of process control controllers; various types of local and/or remote I/O devices or cards (such as Wireless I/O Cards (WIOCs), Ethernet I/O Cards (EIOCs), etc.), and various components of I/O electronic marshalling systems (such as CHARacterization Modules (CHARMs), terminal blocks, CHARM I/O Cards (CIOCs), etc.); various types of Safety Instrumented System (SIS) nodes such as safety controllers, safety logic solvers, SIS repeaters, safety network bridges, safety network gateways, etc.; user interface devices including local and/or remote physical operator workstations, mobile devices, and/or other computing devices that provide user interfaces for run-time operations and/or for other purposes related to the MPDSC platform 10; local and/or remote physical computing devices that provide tools related to the MPDSC platform 10, such as control configuration tools, data consolidation and viewing tools, data analytics and analytics configuration tools, display view configuration tools, diagnostic tools, asset management tools, application stations, etc.; various types of gateways utilized within and/or by the MPDSC platform 10, such as wireless gateways, safety gateways, firewalls, edge gateways, field gateways, inter-system gateways, etc.; and other types of physical nodes which may be utilized within a physical plant environment 15.

In some embodiments, a single VN 30x may represent or virtualize an entire Physical Node. In some embodiments, a single VN 30x may represent or virtualize one or more portions of a particular Physical Node. For example, a single VN 30x may represent or virtualize a particular module or group of modules executing or residing at the particular PN, where such modules may include software modules or components, firmware modules components, and/or hardware modules or components. For example, a first VN may represent or virtualize an entire application executing on the particular PN (such as the entirety of a control module which is executable on a physical process controller), a second VN may represent or virtualize a subset of the entire application executing on the particular PN (such as a particular control model, function, or routine utilized by the control module), a third VN may represent or virtualize the behavior of a protocol-specific I/O card or device associated with the particular PN, and/or a fourth VN may represent or virtualize a PN sub-component as granular as a hardware sub-component of the particular PN (e.g., a port or other interface, a bus, a transceiver, a chip, a board, etc.), or a firmware or software sub-component of the particular PN (e.g., a module, a routine, a function or behavior, a networking address of the particular PN, such as a MAC (Media Access Control) address or other type of addresses, etc.).

Examples of types of physical I/O cards which may be utilized within the physical plant environment 15 and which may be represented and/or virtualized by Virtual Nodes 30x of the MPDSC 10 include, but are not limited to:

discrete output cards, including high density, intrinsically safe, and redundant discrete output cards;

discrete input cards, including high density, intrinsically safe, and redundant discrete input cards;

analog input cards, including analog input cards that support the HART® (Highway Addressable Remote Transducer) communication protocol, redundant analog input cards that support HART, high density redundant analog input cards that support HART, and fast analog input cards;

analog output cards, including analog output cards that support HART, redundant analog output cards that support HART, high density redundant analog output cards that support HART, and fast analog output cards;

serial cards, including redundant, programmable, and redundant programmable serial cards;

interface cards for discrete actuators and/or sensors, RTD (Resistance Temperature Detector) cards, thermocouple cards, millivolt cards, isolated temperature cards, multifunction cards, sequence of events cards, that support the Fieldbus communication protocol, redundant Fieldbus-supporting cards, cards that support the Profibus communication protocol, redundant Profibus-supporting cards, and other types of physical cards.

As illustrated in FIG. 1, the VNs 30a, 30b, 30c, . . . , 30p communicate with each other and with the I/O Switch 25 via respective Publication/Subscription Layers 32a, 32b, 32c, . . . , 32p and 35, which are referred to interchangeably herein as "Pub/Sub Layers," and which are denoted in FIG. 1 by the respective hash-marked portions 32x, 35 of each VN 30x and of the I/O Switch 25. In embodiments of the MPDSC platform 10 in which Physical Nodes are included, such as illustrated in FIG. 1, at least some of the PNs 28, 40a, 40b, 40c disposed in the physical plant environment 15 may include respective Pub/Sub Layers 38, 42a, 42b, 42c. In a sense, the Pub/Sub Layers 32x, 35 (and, in some arrangements, Pub/Sub Layers 38, 42x) serve as a virtual communication network 45 via which various Virtual Nodes 30x and the I/O Switch 25 (and, in some arrangements, the Physical Nodes 40x) may communicate abstracted I/O data. In an example implementation, each Pub/Sub Layer 32x, 35, 38, 42x is a respective interface to the virtual communication network 45.

The virtual communication network 45 may be implemented by one or more physical communications and/or data links and/or networks, which may include wired and/or wireless networks, and which may be implemented using any suitable technology, such as Ethernet, optical, IP, another type other packet network, etc. Data is communicated between nodes of the via the virtual communication network 45 via publication and subscription, and any or more suitable communication protocols that support publication and subscription may be utilized within the virtual communication network 45 for the delivery of data. For example, private packet protocols and/or public or standardized packet protocols (such as IPv6, IoT, and/or IIoT protocols) may be utilized for publication of and subscription to I/O data that is delivered between various nodes 30x, 28, 40x of the virtual communication network 45 and, optionally, to other applications 21x, 22x, e.g., by way of edge gateway systems 28.

For example, each node of the virtual communication network 45 (e.g., Virtual Nodes 30x, I/O switch 25, Physical Nodes 28, 40x, etc.) may publish I/O data to the virtual communication network 45 via its respective Pub/Sub Layer (e.g., via Pub/Sub Layers 32x, 35, 38, 42x, etc.), and each node of the virtual communication network 45 (e.g., Virtual Nodes 30x, I/O switch 25, Physical Nodes 28, 40x, etc.) may subscribe to and obtain I/O data that is published to the virtual communication network 45 via its respective Pub/Sub Layer (e.g., via Pub/Sub Layers 32x, 35, 38, 42x, etc.). Typically, subscriptions to various published data have a one-to-one correspondence between the I/O Switch 25 and each of the other nodes 30x, 28, 40x. In a preferred embodiment, each node 30x, 28, 40x of the virtual communication network 45 accepts subscriptions only from the I/O Switch 25 and not from other nodes, and each node 30x, 28, 40x subscribes to only I/O data that is published by the I/O Switch 25 (where the I/O data published by the I/O Switch 25 may be forwarded data that was generated by other nodes and to which the I/O Switch 25 has subscribed) and not to I/O data published by other nodes. As such, in this preferred one-to-one embodiment, undirected graphs of publication/subscription relationships are restricted as compared to embodiments that allow nodes to have multiple subscriptions with multiple other nodes, thereby reducing network complexity, simplifying network diagnosis and management, and decreasing network load/utilization. To further reduce network complexity, simplify network diagnosis and management, and decrease network load/utilization, additionally or alternatively each node 30x, 28, 40x of the virtual communication network 45 may send, to the I/O Switch 25 via publication, only data that is to be forwarded by the I/O Switch 25 to other nodes of the MPDSC platform 10. Of course, in some embodiments, at least portions of undirected graphs may be implemented in one-to-many, many-to-one, and/or many-to-many relationships, if desired.

Generally speaking, within the MPDSC platform 10, process-related payload data (e.g., as generated by CBMs and/or physical components of the process plant) is abstracted and published as I/O data, and may be delivered to subscriber nodes of the virtual communication network 45 on a demand basis. That is, I/O data may be delivered (e.g., via publication) when the publishing node determines that the process-related data payload requires a new publish event. For example, a publishing node may automatically publish, to the virtual communication network, a certain type of sensor-generated data as I/O data when the sensor-generated data value changes. Optionally, the publishing node may publish, as I/O data, the sensor-generated data value periodically (e.g., every five seconds, ten seconds, one minute, etc.) even when the sensor-generated data value has not changed, e.g., to thereby mitigate lost messages and other fidelity issues which may possibly arise. As such, in some embodiments, no explicit subscription rate is required and/or utilized by subscriber nodes. Consequently, execution of the processing logic (e.g., the component behavior module) at each subscriber node is driven by incoming data that is subscribed to and received via virtual communication network 45, and accordingly, resources utilized by each node and by the virtual communication network 45 may be more efficiently utilized.

In an example illustrative scenario, VN 30a may generate and publish, as I/O data during run-time, a certain set of process-related payload data, e.g., "Data1," to its Pub/Sub Layer 32a. The I/O Switch or Server 25 may have a subscription to I/O data that includes Data1, and may obtain the process-related payload Data1 via the virtual communication network 45, its respective Pub/Sub Layer 35, and its respective subscription. In turn, the I/O Switch or Server 25 may publish the obtained, process-related payload Data1 as I/O data to the virtual communication network 45 via its Pub/Sub Layer 35 for receipt by those nodes that have subscriptions to I/O data that includes Data1. For example, VN 30b may have a subscription to I/O data that includes Data1, and upon publication of Data1 as I/O data via the Pub/Sub Layer 35 of the I/O Switch 25, VN 30b may obtain the process-related payload Data1 via the virtual communication network 45, its respective Pub/Sub Layer 32b, and its subscription thereto. Subsequently, VN 30b may operate upon the obtained process-related payload Data1 values.

Thus, the MPDSC platform 10 abstracts multiple different types of I/O that is utilized in and native to various physical components of industrial process plants (e.g., discrete output, discrete input, analog output, analog input, serial I/O, Railbus, HART, wireless HART, Fieldbus, Profibus, Ethernet, Advanced Physical Layer, and/or any other types of I/O) for delivery amongst virtual and physical nodes via the I/O Switch 25 and the virtual communication network 45 via publication and subscription. Each node of the virtual communication network 45 may perform respective abstraction and de-abstraction (e.g., recovery) of I/O data that it sends and receives via its respective Pub/Sub Layer and, optionally, other subsystems.

Virtual Nodes

Figure 2:
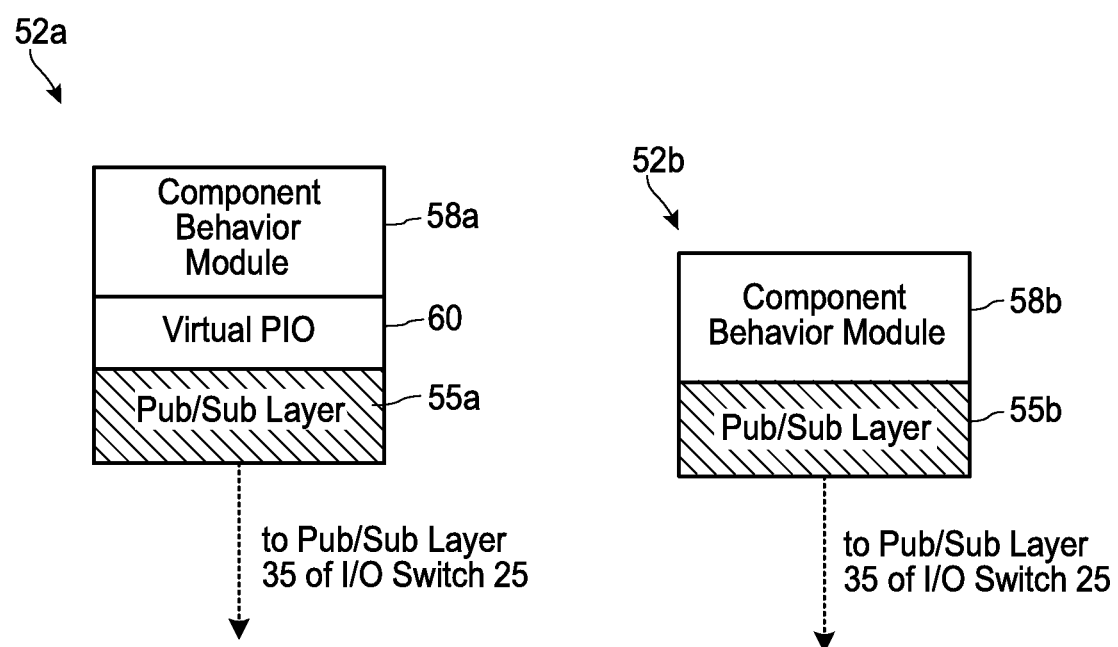
FIG. 2 is a block diagram illustrating embodiments of example virtual node architectures which may be included in the MPDSC system of FIG. 1.

To illustrate I/O abstraction and de-abstraction, FIG. 2 illustrates two example architectural embodiments 52a, 52b of a Virtual Node 30x. Generally speaking, a Virtual Node 30x simulates and/or virtualizes a Physical Node or physical component which may be utilized and operate within the physical plant environment 15. Each VN 52a, 52b includes a respective Pub/Sub Layer 55a, 55b via which the VN 52a, 52b communicates with the I/O Switch 25. Additionally, each VN 52a, 52b includes a respective Component Behavior Module 58a, 58b, which is interchangeably referred to herein as a "Component Business Logic Module" 58a, 58b or a "CBM" 58a, 58b. Generally speaking, a CBM 58x is a module whose execution governs the operating behavior of its respective Virtual Node 30x, e.g., at an application level. For example, the CBM 58x of a Virtual Controller Node may be a particular instance of a control module, where other instances of the control module may be downloaded into physical controllers disposed in the physical plant environment 15 for execution during run-time of the physical plant 15. In another example, the CBM 58x of a Virtual CIOC Node may be a particular instance of a remote I/O module, where other instances of the remote I/O module may execute, during run-time of the physical plant environment 15, at physical CIOCs disposed therein.

As CBMs 58x may execute within physical components, CBMs typically are natively conversant in one or more corresponding native I/O types, such as analog input/output, Fieldbus, Railbus, etc. Further, CBMs 58x typically have no knowledge as to whether they are executing on a Virtual Node 30x of the virtual plant environment 12, on a Physical Node 40x disposed within the physical plant environment 15, or on another physical component disposed within the physical plant environment 15, e.g., nodes PNa-PNk. As such, a CBM 58x sends and receives data in a same manner and using the same processing logic and I/O type irrespective of whether the CBM 58x is executing in the virtual plant environment 12 or in the physical plant environment 15.

In the embodiment of the Virtual Node 52a, process-related payload data that is sent and received by the CBM 58a is abstracted for delivery to/from the VN 52a via a Virtual Process I/O (PIO) Subsystem 60. Generally speaking, the Virtual PIO Subsystem 60 simulates native, physical PIO delivery for the Virtual Node 52a. That is, during run-time of the Virtual Node 52a, the Virtual PIO Subsystem 60 communicates I/O process values and events to/from the CBM 58a using its native I/O, e.g., as though the I/O process values and events were originating from/being delivered to physical hardware. As such, the Virtual PIO Subsystem 60 may be tailored for the specific type of the Virtual Node 52a, where the Virtual Node type is governed by its CBM 58a. For example, if the VN 52a represents a physical controller that communicates with other devices using Railbus I/O, then the Virtual PIO Subsystem 60 provides I/O data to/from the control routine CBM 58a in the form that is utilized by Railbus I/O cards. If the VN 52a represents a CIOC, then the Virtual PIO Subsystem 60 provides I/O data to/from the remote I/O CBM 58a in the form that is utilized by CHARMs.

Further, the Virtual PIO Subsystem 60 may handle data publication and subscription on behalf of the Virtual Node 52a. That is, the Virtual PIO Subsystem 60 may publish data generated by the CBM 58a to the Pub/Sub Layer 55a, and the Virtual PIO Subsystem 60 may subscribe to data generated by other nodes (and forwarded by the I/O Switch 25) via the Pub/Sub Layer 55a. In an embodiment, subscriptions to and publications of data may be based on a tag or other identifier that is unique within the MPDSC platform 10. The tag or other identifier may uniquely identify data, a node, a device, or a component of the MPDSC platform 10, for example. In an embodiment, the tags and/or identifiers may be assigned during configuration and/or commissioning.

As such, at each virtual node 52a within the virtual environment 12, the Virtual PIO Subsystem 60 maintains a logical separation between the CBM 58a and corresponding physical I/O (e.g., via Pub/Sub Layer 55a, virtual communication network 45, and other Pub/Sub Layers 32, 35, 38, 42), similar to the logical separation maintained within the physical environment 15 at each physical node having an on-board CBM 58a and its corresponding physical I/O (e.g., via a physical I/O card or marshalled I/O arrangement). Generally speaking, the Virtual PIO subsystem 60 of any Virtual Node 30 maintains a logical separation between any I/O subscriber (the CBM 58a, another module, another type of I/O consumer, etc.) that is included in the Virtual Node 30 and its corresponding physical I/O.

In the embodiment of the Virtual Node 52b shown in FIG. 2, the Virtual PIO Subsystem 60 is omitted or is not utilized. Typically, the types of virtual nodes that utilize the VN architecture 52b are those nodes whose CBMs 58b are natively able to communicate with the physical components and technology via which the virtual communication network 45 is implemented. For example, if the virtual communication network 45 is implemented via an IP protocol over Ethernet, then a Virtual Node 52b that simulates an EIOC includes a CBM 58b that is natively configured to communicate using IP protocol over Ethernet. Consequently, the EIOC Virtual Node 52b may exclude (or may turn off or ignore the operation of) the Virtual PIO Subsystem 60, and the EIOC Virtual Node 52b may handle delivery of data to/from the Virtual Node of 52b by using only the CBM 58b and the Pub/Sub Layer 55b.

Physical Nodes

Figure 3:
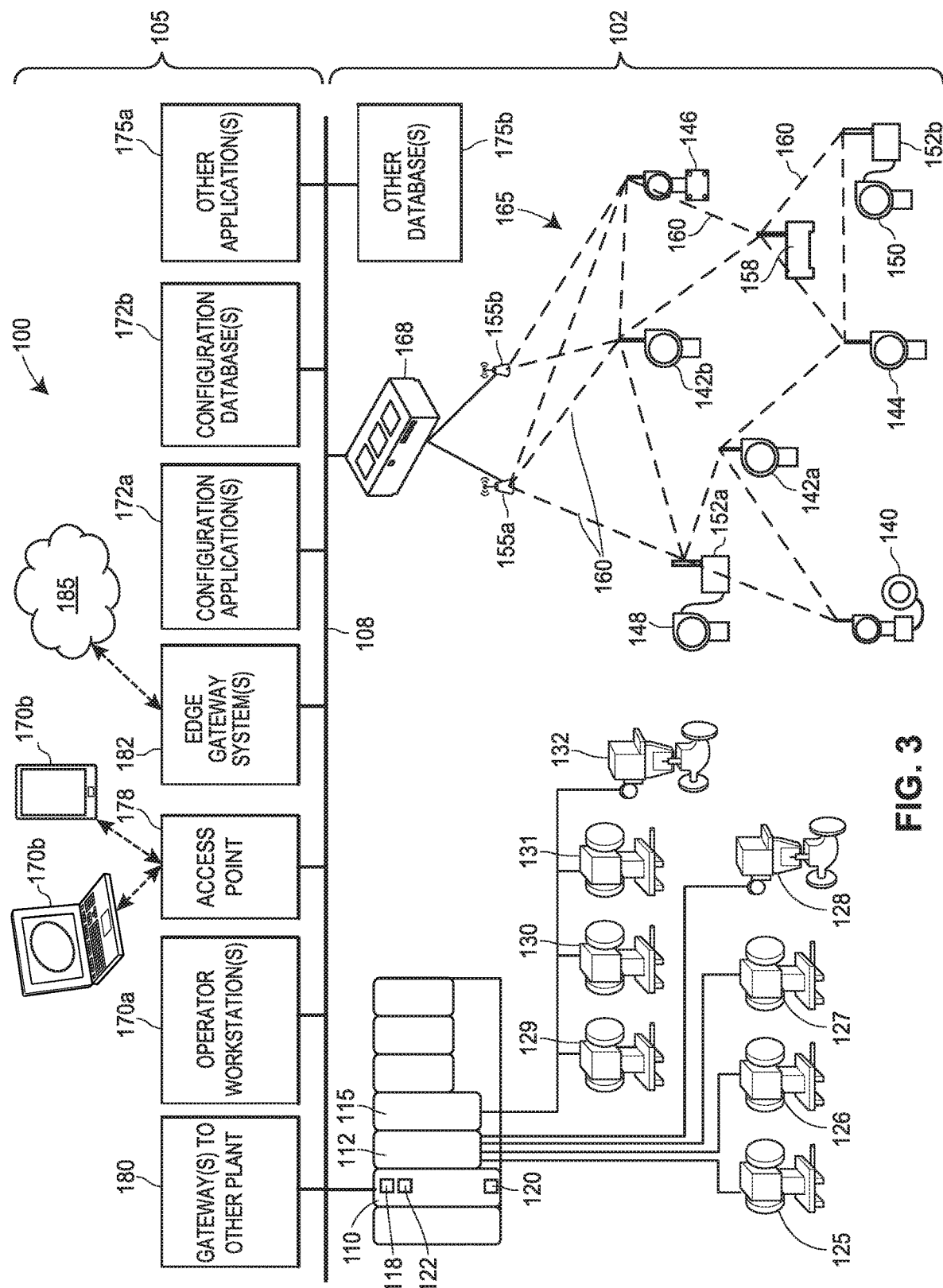
FIG. 3 is an example arrangement of a physical plant environment which the MPDSC system of FIG. 1 may support.

FIG. 3 is a block diagram of an example physical plant environment 100 in conjunction with the MPDSC platform 10 of FIG. 1 may operate. For example, the physical environment portion 15 of the MPDSC platform 10 illustrated in FIG. 1 may include at least portions of the physical plant environment 100.

The physical plant 100 controls an industrial process (or, in some embodiments, operates in conjunction with a virtual plant environment, such as the virtual plant environment 12, to control the industrial process), where the industrial process may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change). The physical process plant 100 of FIG. 3 includes a field environment 102 and a back-end environment 105, each of which is communicatively connected to the other by a process control backbone or data highway 108, which may include one or more wired and/or wireless communication links and/or networks, and may be implemented using any desired or suitable communication protocol such as, for example, an Ethernet protocol, an IP protocol, or another packet protocol.

At a high level (and as shown in FIG. 3), the field environment 102 includes physical components (e.g., process control devices, networks, network elements, etc.) that are installed and interconnected to operate to control the industrial process during run-time. By and large, these physical components are located, disposed, or otherwise included in the field environment 102 of the physical process plant 100 in which raw materials are received and processed using the physical components disposed therein to thereby generate one or more physical products (e.g., paper, refined oil, pharmaceuticals, etc.). By contrast, the back-end environment 105 of the physical process plant 100 includes various physical components such as computing devices, operator workstations, databases or databanks, etc. that are shielded and/or protected from the harsh conditions and materials of the field environment 102. In some configurations, various computing devices, databases, and other components and equipment included in the back-end environment 105 of the physical process plant 100 may be physically located at different physical locations, some of which may be local to the physical plant 100, and some of which may be remote.

As shown in FIG. 3, the field environment 102 includes one or more process controllers 110 that are communicatively connected to the data highway 108. Each of the process controllers 110 may be connected to one or more intermediary nodes 112, 115 (e.g., I/O cards, I/O devices, I/O systems, etc.) facilitating communication between the controllers 110 and the field devices. Generally speaking, in the process control industry, the term "I/O" is sometimes used in a number of related but different contexts. The term generally refers to a logical link or communication channel that communicatively couples a field device to an I/O card or controller (e.g., "I/O channel"), but may be used when referring to a number of other concepts, such as the physical devices that are utilized to transmit signals to or receive signals from field devices via I/O channels (e.g., "I/O devices" or "I/O cards") and connectors or terminals associated with the I/O devices (e.g., "I/O connectors"). I/O devices and I/O cards 112, 115 may be stand-alone, individual physical devices each of which is connected to a respective controller and to one or more respective field devices, such as illustrated in FIG. 3. In some arrangements (not shown in FIG. 3), I/O devices, cards, connectors, and other I/O-related components such as terminal blocks, modules, processors, etc. are included in an I/O electronic marshalling system that enables flexible I/O delivery between multiple controllers and multiple field devices of various types, such as described in U.S. Pat. Nos. 7,684,875; 8,332,567; 8,762,618; 8,977,851; 9,083,548; 9,411,769; 9,495,313; and 9,946,240, the entire contents of which are expressly incorporated by reference herein. As such, for clarity of discussion and as utilized herein, the term "I/O devices" refers generally to physical I/O devices, cards, electronic marshalling systems, and components thereof via which I/O channels are implemented to thereby communicatively couple field devices and controllers.

Still, in the process control industry, the term "I/O" generally may be used to refer to the signals transmitted on the I/O channel (e.g., "I/O signals"), variables or commands represented by the signals (e.g., "I/O parameters"), or to the values of the variables or commands carried by the signals (e.g., "I/O parameter values" or "I/O data payload"). Accordingly, for clarity of discussion and as utilized herein, I/O signals, I/O parameters, and I/O parameter values are collectively and generally referred to herein as "I/O data" or "process I/O data."

To the extent the term "I/O" is referenced herein without a qualifier, the context of the sentence should make clear which of these concepts is being discussed. Further, it should be understood that an "I/O channel" represents a particular type of "communication channel" or "channel." That is, unless the context of the sentence suggests otherwise, references in this description to the term "channel" or the term "communication channel," without the qualifier "I/O," may refer to a communication link that could be an I/O channel in some implementations, but may also refer to a communication link other than an I/O channel in some implementations.

At any rate, and returning to FIG. 3, each process controller 110 of the physical process plant 100 implements a control strategy defined by one or more control routines (e.g., one or more component behavior modules), which may be stored in a memory of the controller 110. When a processor of the controller executes one or more of the control routines, the controller transmits to a field device a control signal (i.e., a "control output") over wired or wireless process control communication links or networks to other field devices to control the operation of a process in the plant 100. The controller may generate a control signal based on: (i) one or more received signals, which may be referred to as "control inputs" (e.g., one or more received signals representing measurements obtained by field devices), and (ii) the logic of the one or more control routines, which may be defined by one or more software elements (e.g., function blocks). Typically, a controller manipulates a process input (which may be referred to as a "manipulated variable") to change a particular process output (which may be referred to as a "controlled variable" or simply a "process variable") based on feedback (i.e., a measurement of the controlled variable) and a desired value for the process output (i.e., a setpoint).

Generally, at least one field device performs a physical function (e.g., opening or closing a valve, increasing or decreasing a temperature, taking a measurement, sensing a condition, etc.) to control the operation of a process implemented in the physical process plant 100. Some types of field devices communicate with controllers by using I/O devices. Process controllers, field devices, and I/O devices may be wired or wireless, and any number and combination of wired and wireless process controllers, field devices, and/or I/O devices may be included in the process plant environment or platform 100.

The Front-End Environment 102 of the Plant 100

For example, FIG. 3 illustrates a process controller 110 that is communicatively connected to wired field devices 125-132 via input/output (I/O) devices 112 and 115, and that is communicatively connected to wireless field devices 140-146 via a wireless gateway 168 and the data highway 108. In some configurations (not shown), the controller 110 may be communicatively connected to the wireless gateway 168 using one or more communications networks other than the backbone 108, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 110, which may be, by way of example, the DeltaV™ controller sold by Emerson Process Management, may operate to implement a batch industrial process or a continuous industrial process using at least some of the field devices 125-132 and 140-146. In an embodiment, in addition to being communicatively connected to the process control data highway 108, the controller 110 is also communicatively connected to at least some of the field devices 125-132 and 140-146 using any desired hardware and software associated with, for example, standard 4-20 mA devices, I/O devices 112, 115, and/or any smart communication protocol such as the FOUNDATION® Fieldbus protocol, the HART® protocol, the WirelessHART® protocol, etc. In FIG. 3, the controller 110, the field devices 125-132 and the I/O devices 112, 115 are wired devices, and the field devices 140-146 are wireless field devices. Of course, the wired field devices 125-132 and wireless field devices 140-146 could conform to any other desired standard(s) or protocols, such as any wired or wireless protocols, including any standards or protocols developed in the future.

The process controller 110 of FIG. 3 includes a processor 120 that implements or oversees one or more process control routines 118 (e.g., that are stored in a memory 122 of the controller 110). The processor 120 is configured to communicate with the field devices 125-132 and 140-146 and with other nodes communicatively connected to the controller 110. It should be noted that any control routines or modules described herein may have parts thereof implemented or executed by different controllers or other devices if so desired. Likewise, the control routines or modules 118 described herein which are to be implemented within the process control plant 100 may take any form, including software, firmware, hardware, etc. Control routines may be implemented in any desired software format, such as using object oriented programming, ladder logic, sequential function charts, function block diagrams, or using any other software programming language or design paradigm. The control routines 118 may be stored in any desired type of memory 122, such as random access memory (RAM), or read only memory (ROM). Likewise, the control routines 118 may be hard-coded into, for example, one or more EPROMs, EEPROMs, application specific integrated circuits (ASICs), or any other hardware or firmware elements. Thus, the controller 110 may be configured to implement a control strategy or control routine in any desired manner.

The controller 110 implements a control strategy using what are commonly referred to as function blocks, where each function block is an object or other part (e.g., a subroutine) of an overall control routine and operates in conjunction with other function blocks (via communications called links) to implement process control loops within the MPDSC platform 10. Control based function blocks typically perform one of: (i) an input function, such as that associated with a transmitter, a sensor or other process parameter measurement device (sometimes referred to as "input blocks"); (ii) a control function, such as that associated with a control routine that performs PID, fuzzy logic, etc. (sometimes referred to as "control blocks"); or (iii) an output function which controls the operation of some device, such as a valve, to perform some physical function within the process control plant 100 (sometimes referred to as "output blocks"). Of course, hybrid and other types of function blocks exist.

Function blocks may be stored in and executed by the controller 110, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. One or more of the control routines 118 may implement one or more control loops which are performed by executing one or more of the function blocks. In a sense, the control routines 118 may be viewed as the component behavior modules of the controller 110.

The wired field devices 125-132 may be any types of devices, such as sensors, valves, transmitters, positioners, etc., while the I/O devices 112 and 115 may be any types of process control I/O devices conforming to any desired communication or controller protocol. For example, the I/O devices 112, 115 may be included in an I/O electronic marshalling system. In FIG. 3, the field devices 125-128 are standard 4-20 mA devices or HART® devices that communicate over analog lines or combined analog and digital lines to the I/O device 112, while the field devices 129-132 are smart devices, such as FOUNDATION® Fieldbus field devices, that communicate over a digital bus to the I/O device 115 using a FOUNDATION® Fieldbus communications protocol. In some embodiments, though, at least some of the wired field devices 125, 126 and 128-131 and/or at least some of the I/O devices 112, 115 additionally or alternatively communicate with the controller 110 using the process control data highway 108 and/or by using other suitable control system protocols (e.g., Profibus, DeviceNet, Foundation Fieldbus, ControlNet, Modbus, HART, etc.). In some arrangements (not shown in FIG. 3), at least some of the field devices 125-132 may communicate with the controller 110 via an electronic I/O marshalling system instead of via an individual I/O device 112, 115.

In FIG. 3, the wireless field devices 140-146 communicate via a wireless process control communication network 165 using a wireless protocol, such as the WirelessHART® protocol. Such wireless field devices 140-146 may directly communicate with one or more other devices or nodes of the wireless network 165 that are also configured to communicate wirelessly (using the wireless protocol or another wireless protocol, for example). To communicate with one or more other nodes that are not configured to communicate wirelessly, the wireless field devices 140-146 may utilize a wireless gateway 168 connected to the process control data highway 108 or to another process control communications network. The wireless gateway 168 provides access to various wireless devices 140-158 of the wireless communications network 165. In particular, the wireless gateway 168 provides communicative coupling between the wireless devices 140-158, the wired devices 125-132, and/or other nodes or devices of the physical process control plant 100. For example, the wireless gateway 168 may provide communicative coupling by using the process control data highway 108 and/or by using one or more other communications networks of the physical process plant 100.

Similar to the wired field devices 125-132, the wireless field devices 140-146 of the wireless network 165 perform physical control functions within the physical process plant 100, e.g., opening or closing valves, or taking measurements of process parameters. The wireless field devices 140-146, however, are configured to communicate using the wireless protocol of the network 165. As such, the wireless field devices 140-146, the wireless gateway 168, and other wireless nodes 152-158 of the wireless network 165 are producers and consumers of wireless communication packets.

In some configurations of the physical process plant 100, the wireless network 165 includes non-wireless devices. For example, in FIG. 3, a field device 148 of FIG. 3 is a legacy 4-20 mA device and a field device 150 is a wired HART® device. To communicate within the network 165, the field devices 148 and 150 are connected to the wireless communications network 165 via a wireless adaptor 152*a*, 152*b*. The wireless adaptors 152*a*, 152*b* support a wireless protocol, such as WirelessHART, and may also support one or more other communication protocols such as Foundation® Fieldbus, PROFIBUS, DeviceNet, etc. Additionally, in some configurations, the wireless network 165 includes one or more network access points 155*a*, 155*b*, which may be separate physical devices in wired communication with the wireless gateway 168 or may be provided with the wireless gateway 168 as an integral device. The wireless network 165 may also include one or more routers 58 to forward packets from one wireless device to another wireless device within the wireless communications network 165. In FIG. 3, the wireless devices 140-146 and 152-158 communicate with each other and with the wireless gateway 168 over wireless links 160 of the wireless communications network 165, and/or via the process control data highway 108.

The Back-End Environment 105 of the Plant 100

As noted, the back-end environment 105 may include various components such as computing devices, operator workstations, databases or databanks, etc. that are typically shielded and/or protected from the harsh conditions and materials of the field environment 102. For example, the back-end environment 105 may include any one or more of the following, each of which may be communicatively connected to the data highway 108: (i) one or more operator workstations 170*a* and other local or remote user interface devices 170*b*; (ii) one or more configuration applications 172*a* and configuration databases 172*b*; (iii) one or more other types of applications 175*a* and/or databases 175*b*, which may include, for example, tools, diagnostics, asset management systems, simulators, and/or other types of applications; (iv) one or more other wireless access points 178 that communicate with other devices associated with plant 100 (e.g., user interface devices 170*b* or other devices) using various wireless protocols; (v) one or more plant gateway systems 180 to other plants; (vi) one or more edge gateway systems 182 to systems 185 that are external to the immediate, OT layers of the physical process control platform 100 (e.g., IT networks/systems of the enterprise, and/or external data networks/systems, which may be implemented on cloud computing and/or other suitable platforms); and/or (vii) other physical components that are specially configured via hardware and software to support the process plant 100.

Operator Workstations and User Interface Devices 170*a*, 170*b*

The operator workstations 170*a* and other user interface devices 172*b* may be utilized by operators to view and monitor run-time operations of the physical process plant 100, as well as to take any diagnostic, corrective, maintenance, and/or other actions that may be required. At least some of the operator workstations 172*a* may be located at various, protected areas in or near the plant 100, and in some situations, at least some of the operator workstations 172*b* may be remotely located, but nonetheless in communicative connection with the plant 10. Operator workstations 172*a*, 172*b* may be wired or wireless computing devices.

Configuration Applications 172*a* and Configuration Databases 172*b*

The configuration applications 172*a* and the configuration databases 172*b* may be utilized to configure certain aspects of the plant 100, such as control modules/routines, user interfaces, data monitoring/analytics, etc. For example, various instances of the configuration application 172*a* may execute on one or more computing devices (not shown) to enable users to create or change process control modules and download these modules via the data highway 108 to the controllers 110, to create or change operator interfaces via which in operator is able to view data and change data settings within process control routines, to create or change data monitoring/analytics routines and functions which may be downloaded into various physical components within the field environment 102, etc. The configuration databases 172*b* store the created (e.g., configured) modules, operator interfaces, data monitoring/analytics, etc. Generally, the configuration applications 172*a* and configuration databases 172*b* are centralized and have a unitary logical appearance to the physical process control platform 100, although multiple instances of the configuration applications 172*a* may execute simultaneously within the physical process control platform 100, and the configuration databases 172*b* may be implemented across multiple physical data storage devices. Accordingly, the configuration applications 172*a*, the configuration databases 172*b*, and the user interfaces thereto (not shown) comprise a configuration or development system 172 for various types of modules, e.g., control modules, display or operator interface modules, and/or analytics modules. Typically, but not necessarily, the user interfaces for the configuration system 172 are different than the operator workstations/user interface devices 170, as the user interfaces for the configuration system 172 are utilized by configuration and development engineers irrespective of whether or not the plant 100 is operating in production mode, whereas the operator workstations/user interface devices 170 are utilized by operators during run-time operations of the physical process plant 100.

Regarding commissioning of the physical components of the MPDSC platform 100, the configuration database 172*b* may store data and other information that specifically identifies and/or addresses the various physical devices or components and their interconnections that are planned for or desired to be implemented on the process plant floor or field environment 102. Some of this commissioning data may be provided to components in the field environment 102 for use in commissioning of devices and loops therein, and some of this data may be utilized in the back-end environment 105, e.g., for the design, development, and preparation of control modules, operator interface modules, and/or data analytics modules that will operate in conjunction with the field environment 102 during live operations of the physical process plant 100. In an example, an approved control module is downloaded from the configuration database 172*b* into a process controller 110 so that, when executed during live operations, the process controller 110 operates in accordance with its resident control module to send and receive various signals to/from other components in its loop (and, in some cases, to/from other process controllers), thereby controlling at least a portion of the process in the physical process plant 100.

The configuration database 172*b* may store a number of logical identifiers of components in the field environment 102, enabling the controller 110 and other devices to reference the components and signals associated with the components by way of the logical identifiers. For example, for a given field device, the configuration database 172*b* may store information mapping or binding a logical identifier to a particular hardware address or I/O channel. The hardware address may identify a particular controller, a particular I/O device connected to the particular controller, and/or a particular address for the I/O channel connecting the particular I/O device to the field device. In some instances, this mapping or binding may be stored at the controller 110, the user interface device 170*b*, the operator workstation 170*a*, or any other desired device (e.g., any device needing to resolve the logical identifier). After a logical identifier has been bound to a hardware address or I/O channel, the identifier is considered "assigned." In some cases, the plant 100 includes "unassigned" logical identifiers, which are identifiers that a software element (e.g., a control routine and/or a function block) references but that has no binding. That is, a logical identifier is considered "unassigned" when the plant 100 and the configuration database 172*b* have no hardware address or I/O channel that has been bound to the tag. Thus, when an unassigned logical identifier is referenced by a control routine, no value carried by a signal in the plant 100 will be read and no command will be transmitted via a signal to a field device in the plant 100.

Examples of such logical identifiers include Device Tags (DTs), each of which represents a particular instrument, controller, valve, or other physical field device, and Device Signal Tags (DSTs), each of which represents a particular signal that is received or generated by a particular device and that typically corresponds to a particular parameter utilized by the field device. For some devices, a Device Signal Tag comprises a combination of a device's Device Tag and an identifier of a specific signal received or generated by that device, e.g., an identifier of a specific parameter referenced by a control module. For some devices, typically legacy or dumb devices, a Device Tag represents both the physical device and a signal generated by the device. Generally speaking, a device's logical identifier is used by the physical process plant 100 in both the field environment 102 and in the back-end environment 105 to uniquely identify the device. The DTs and DSTs may be referred to as "system tags" or "system identifiers."

In some instances, the smart field devices 129-132 also may store logical identifiers unique to the smart field devices 129-132. These logical identifiers may be distinct from the system tags utilized by the plant 100 to identify the field devices 129-132, and may be referred to as "source identifiers" or "source tags." Source tags may or may not be stored at the configuration database 172b, depending on the implementation.

The configuration database 172b may store data and other information that specifically identifies and/or address various virtual devices or components (e.g., various Virtual Nodes 30) that are planned for or desired to be implemented in the virtual plant environment 12. Similar to physical devices and components, the configuration database 172 may store respective logical identifiers of components of the virtual environment 12, thereby enabling other devices and/or components (whether physical or virtual) to reference the virtual components. For example, similar to Physical Nodes 40x, various Virtual Nodes 30x may be uniquely identified within the MPDSC platform 10 (e.g., across both the virtual 12 and physical 15 environments) via their respective Device Tags (DTs), Devices Signal Tags (DSTs), source tags, and/or other types of unique identifiers. Further sections of this disclosure discuss the configuring and identification of virtual devices and components in more detail.

Other Applications 175a and Databases 175b

The other applications 175a and databases 175b may include instances of applications that are specific to the process plant 100, such as diagnostic applications/databases, data historian applications/databases, system level health monitoring applications/databases, local and/or remote user interfaces, etc. Generally speaking, the other applications 175a and databases 175b may include one or more applications executing at the OT layers 18 of the process plant 100 and their associated databases. Additionally or alternatively, the other applications 175a and databases 175b may include one or more applications executing at the IT layers 20 associated with the process plant 100, such as inventory management applications, personnel management applications, supply chain management applications, other types of enterprise-related applications, weather/environmental applications, etc., and their associated databases. For example, the other applications 175a and databases 175b may include the applications 21a-21n and their associated databases. Still further additionally or alternatively, the other applications 175a and databases 175b may include one or more applications that are external to and/or that execute remotely from the process plant 100 and/or its enterprise, such as simulation applications, analytics applications, IoT applications, IIoT applications, etc., and their associated databases. For example, the other applications 175a and databases 175b may include the applications 22a-22m and their associated databases. The other applications 175a and databases 175b may include third-party applications and/or may include applications provided by the enterprise associated with the process plant 100. At least some of the other applications 175a and databases 175b may be accessed via an edge gateway system 28 and/or some other type of security and/or firewall system.

Wireless Access Points 178

The one or more other wireless access points 178 enable devices in the back-end environment 105 (and sometimes in the field environment 102) to communicate with other devices using wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radio communication Sector) compatible protocols, short-wavelength radio communications such as near field communications (NFC) and Bluetooth, or other wireless communication protocols. Typically, such wireless access points 178 allow handheld or other portable computing devices (e.g., user interface devices 170b) to communicate over a respective wireless process control communication network that is different from the wireless network 165 and that supports a different wireless protocol than the wireless network 165. For example, a wireless or portable user interface device 170b may be a mobile workstation or diagnostic test equipment that is utilized by an operator within the physical process plant 100 (e.g., an instance of one of the operator workstations 170a). In some scenarios, in addition to portable computing devices, one or more process control devices (e.g., controller 110, field devices 125-132, or wireless devices 168, 140-158) also communicate using the wireless protocol supported by the access points 174.

Gateway Systems 180, 182

The gateway nodes or systems 180 and 182 may interface with systems that are external to the immediate physical process control plant 100. Typically, such systems are customers or suppliers of information generated or operated on by the physical process plant 100. For example, the process control plant 100 may include a plant gateway node 180 to communicatively connect the immediate physical process plant 100 with another process plant. Additionally or alternatively, the process control plant 100 may include an edge gateway node or system 182 to communicatively connect the immediate physical process plant 100 with an external public or private system, such as a laboratory system (e.g., Laboratory Information Management System or LIMS), an operator rounds database, a data consolidation and viewing system, a data analytics system, a materials handling system, an asset management system, a maintenance management system, a product inventory control system, a production scheduling system, a weather data system, a shipping and handling system, a packaging system, the Internet, an IOT application, an IIOT application, or other external systems.

Generally speaking, the edge gateway system 182 allows communications to be securely delivered between the process plant 100 and other networks 185. In an example architecture, an edge gateway system 182 includes an internal- or plant-facing engine (which may be referred to as a "field gateway") and an external- or outwards-facing engine (which may be referred to as an "edge gateway"), where the plant-facing engine and the external-facing engine cooperate to securely deliver process plant data (e.g., data generated by the OT layers) to external networks and/or applications (e.g., IT layers and/or external networks and/or systems) that are consumers of the plant data. In one of many embodiments, the plant-facing engine collects data generated by various components of the process plant 100, and securely transmits the collected data across one or more secured communication links to the external-facing engine, e.g., via a first set of publications. The external-facing engine has subscribed to the various publications generated by the plant-facing engine and obtains the collected plant data therefrom. In turn, the external-facing engine securely transmits the obtained plant data to one or more external client applications (e.g., applications 21a-21n, 22a-22m) within the networks 185, e.g., via a second set of publications. Publications and subscriptions at the plant-facing engine and/or at the external-facing engine may be respectively configured as desired. Typically, though, the publication/subscription, encryption, and/or other secure data delivery mechanisms that are utilized between the plant-facing engine and the external-facing engine differ from the publication/subscription, encryption, and/or other secure data delivery mechanism that are utilized between the external-facing engine and external applications. In some embodiments, for additional security, the edge gateway system 182 includes a one-way data diode disposed between the plant-facing engine and the external-facing engine to prevent data from flowing from external networks 185 into the process plant 100. Examples of edge gateway systems may be found in U.S. Patent Publication Numbers 20180115516; 20180115528; 20180115517; and 20180113442, the entire disclosures of which are hereby incorporated by reference. Of course, other edge gateway systems may be additionally or alternatively utilized by the process plant 100.

It is noted that although FIG. 3 only illustrates a single controller 110 with a finite number of field devices 125-132 and 140-146, wireless gateways 168, wireless adaptors 152, access points 155, routers 158, and wireless process control communications networks 165 included in the example physical process plant 100, this is only an illustrative and non-limiting embodiment. Any number of controllers 110 may be included in the process control plant or platform 100, and any of the controllers 110 may communicate with any number of wired or wireless devices and networks 125-132, 140-146, 168, 152, 155, 158 and 165 to control a process in the plant 100.

Now jointly referring to FIGS. 1 and 3 with respect to Physical Nodes, each Physical Node 40*a*-40*c* and PN*a*-PN*k* shown in FIG. 1 may be a respective one of the physical components or devices discussed with respect to the process control plant 100 of FIG. 3. For example, PN 40*b* may be a process controller that has a respective Pub/Sub Layer 42*b* and that is communicatively connected to a field device PN*h* via an I/O card PN*g*. In another example, PN 40*c* may be a CIOC (having a respective Pub/Sub Layer 42*c*) to which six different field devices PN*a*-PN*f* are communicatively connected, or PN 40*c* may be a wireless access point 178 or an EIOC (having a respective Pub/Sub Layer 40*c*) to which various other physical components PN*a*-PN*f* without Pub/Sub Layers are communicatively connected. In yet another example, PN 40*a* may be an I/O marshalling device or I/O hub device that delivers, via its Pub/Sub layer 42*a*, process I/O data on behalf of multiple other PNs that do not have Pub/Sub layers, e.g., PN*i*-PN*k*. The I/O marshalling or hub device 40*a* may be a stand-alone device, or may be included in another physical component disposed within the physical plant environment 15, such as in a controller 110, an I/O device 112, 115 (e.g., a CIOC, an ECOC, a WIOC, etc.), an access point 178, a gateway 180, 182, etc. Further, in some implementations, the edge gateway system 28 and its Pub/Sub Layer 38 may be a Physical Node that is communicatively connected (not illustrated in FIG. 1) to various physical components of the physical plant environment 15 (e.g., PNs 40*a*-40*c* and PN*a*-PN*k*), e.g., in a manner such as discussed with respect to FIG. 3.

I/O Switch

As mentioned above, the I/O Switch 25 shown in FIG. 1 serves as a data broker, switching fabric, or router for process I/O data between nodes of the virtual communication network 45. That is, the I/O Switch 25 forwards, on behalf of a publishing node, I/O data generated by the publishing node to nodes that have subscribed to that data. Generally speaking, the I/O Switch 25 may maintain (and update) records of what I/O data is published by which node, and which nodes have subscribed to which published I/O data. In an embodiment, the I/O data may be identified within the records by the unique identifier, name, or tag that is unique across the MPDSC platform 10, or by a respective indication thereto. The unique identifier may identify the process-related payload data included in the I/O data and/or its publishing node, for example. In an embodiment, the unique identifiers, names, or tags are assigned during configuration and/or commissioning. The I/O Switch 25 utilizes the stored records to route incoming, published data to subscribers of the published data. For example, the I/O Switch 25 may subscribe to I/O data that is published by various nodes 28, 30*x*, 40*x*, and upon receiving the published I/O data via its subscriptions, the I/O Switch 25 may itself publish the received I/O data to selected subscriber nodes 28, 30*x*, 40*x* in accordance with the stored records. Typically, but not necessarily, the I/O Switch 25 does not maintain, record, or store any I/O data and/or process-related payload data that is published by other nodes of the virtual communication network 45.

Importantly, the I/O Switch 25 is configured to switch or forward received process I/O data with minimal delay. Indeed, in a prototype, the I/O Switch 25 was able to forward received process I/O data through the I/O Switch 25 in time intervals measured in hundreds of microseconds, such as under 500 microseconds, under 200 microseconds, and under 100 microseconds, depending on loading.

Generally speaking, the I/O Switch 25 may be implemented via hardware, firmware, and/or software. In an example, the I/O Switch 25 is implemented using one or more physical, hardware devices on which specialized software is installed to provide at least some of the I/O Switch 25 functionality described herein; that is, the I/O Switch 25 may be implemented as an appliance. In another example, the I/O Switch 25 is implemented as software (e.g., programs, routines, applications, etc.) that may be installed on and executed by a server or bank of computing devices to provide at least some of the I/O Switch 25 functionality described herein. In yet another example, the I/O Switch 25 is implemented via virtualization, e.g., as a virtual machine, a container (such as Docker, LXD, etc.), or another type of virtualized implementation.

The Pub/Sub Layer 35 of the I/O Switch 25 generally is similar in configuration and functionality to the Pub/Sub Layers 32*x*, 38, 42*x*, 55*x* described elsewhere within this disclosure. However, the Pub/Sub Layer 35 of the I/O Switch 25 is further configured to accept and maintain subscription requests for various identified process I/O data. As discussed above, subscriptions are recorded at and maintained by the I/O Switch 25, e.g., in one or more tangible, non-transitory memories. Further, the Pub/Sub Layer 35 of the I/O Switch 25 is configured to forward published process I/O data to subscribing nodes, which may include other I/O Switches.

Figure 4:
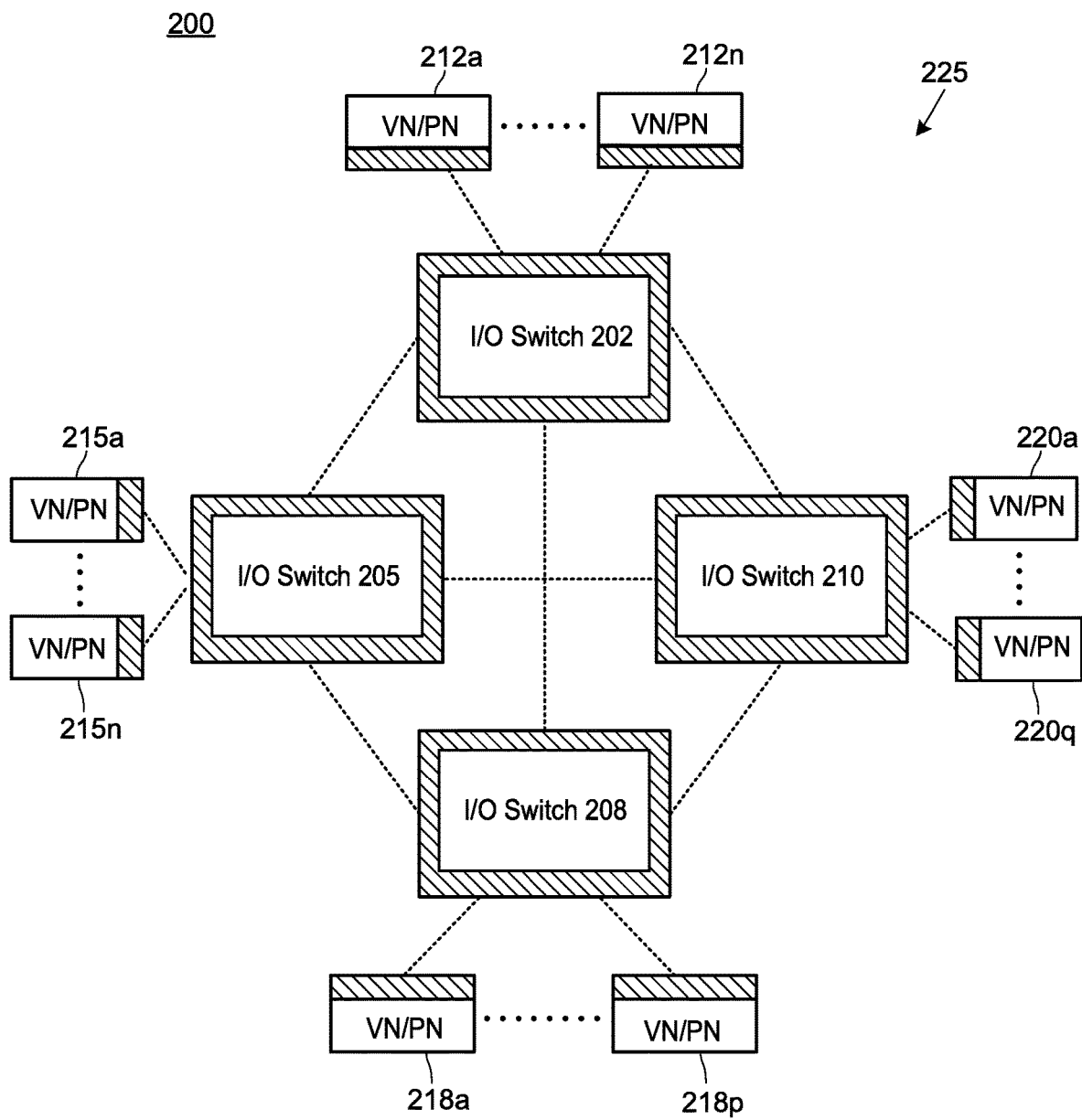
FIG. 4 depicts an example arrangement of multiple I/O Switches, which may be at least partially implemented in the MPDSC system of FIG. 1.

To illustrate, FIG. 4 depicts an example arrangement 200 of multiple I/O Switches 202, 205, 208, 210 which may be included in the MPDSC platform 10 of FIG. 1. In an example, each I/O Switch 202, 205, 208, 210 has a respective architecture similar to that of the I/O Switch 25, including a respective Pub/Sub Layer (as indicated by the respective hash-marked portions). Also similar to the I/O Switch 25, each I/O Switch 202, 205, 208, 210 is associated and interconnected with, via the virtual communication network 225, a respective set of VNs and/or PNs 212*a*-212*n*, 215a-215m, 218a-218p, and 220a-220q amongst which the respective I/O Switch 202, 205, 208, 210 forwards process I/O data via publishing and subscribing, such as in a manner described above. Although the arrangement 200 includes four I/O switches 202, 205, 208, 210, the concepts discussed herein with respect to the arrangement 200 are easily applied to greater or lesser numbers of I/O switches that are interconnected in a mesh topology.

In FIG. 4, each I/O Switch 202, 205, 208, 210 is further able to forward, via the virtual communication network 225, process I/O data to each of the other I/O Switches 202, 205, 208, 210. By interconnecting multiple I/O Switches 202, 205, 208, 210, the number of serviced Virtual Nodes and/or Physical Nodes is able to be expanded to support larger systems 10 and to provide additional delivery bandwidth. In the arrangement 200, each I/O Switch 202, 205, 208, 210 may publish data on behalf of its respective set of VNs/PNs to other I/O Switches 202, 205, 208, 210. Similarly, each I/O Switch 202, 205, 208, 210 may subscribe to data that is forwarded by other I/O Switches 202, 205, 208, 210 on behalf of their respective sets of VNs/PNs 212a-212n, 215a-215m, 218a-218p, 220a-220q.

The arrangement 200 illustrates each of the I/O Switches 202, 205, 208, 210 as being directly linked to each of the other I/O Switches 202, 205, 208, 210. That is, the virtual communication network 225 has a fully-interconnected or mesh topology. Accordingly, in an implementation of this arrangement 200, the maximum transmission delay from a publisher node to a subscriber node is bounded, as the maximum number of hops that a particular process I/O data payload may undergo is three. In other implementations of the arrangement 200, the maximum number of hops may differ. For example, the maximum number of hops may be increased, e.g., for monitoring traffic, when time-sequencing capabilities, such as Time Sequencing Networking, or other suitable time-sequencing capabilities) are utilized, and the like. A maximum number of hops within the arrangement 200 may be configured and modified, if desired.

Of course, other interconnected topologies (e.g., hub-and-spoke, star, ring, tree, hybrid, etc.) may be possible in addition to or as an alternative to the mesh topology for the virtual communication network 225. Generally speaking, subscriptions to process I/O data that is published by a particular publishing node, e.g., node 215a, are made to and managed by its corresponding I/O Switch, e.g., I/O Switch 205. However, if the I/O Switch 205 does not have a record for the particular data to which a subscription is requested, the I/O Switch 205 may forward the subscription request to the other I/O Switches 202, 208, 210. The particular I/O Switch corresponding to the node that publishes the requested data, e.g., I/O Switch 210 corresponding to publishing node 220q, will have a record corresponding to the requested data and its publishing node 220q, and will respond to the I/O Switch 205 corresponding to the requesting node 215a, upon which the I/O Switch 105 may create and store a corresponding record for the requested data. In this manner, a traversal route for the requested data from publishing node 220q to subscribing node 215a via the I/O Switches 210, 205 may be established.

In an embodiment, the arrangement 200 may be implemented across multiple MPDSC systems 10. For example, I/O Switch 202 may be included in a first MPDSC system, and I/O Switch 205 may be included in a different MPDSC system. As such, different MPDSC systems may publish and/or subscribe to each other's process I/O data via one or more links of the virtual communication network 225.

Real-Time Virtual Control and Associated Operations

As mentioned above, Virtual Nodes 30x may virtualize the behavior of various physical components which are operable within the physical plant environment 15. Further, due to the features of the MPDSC platform 10, virtualized components 30x of the virtual plant environment 12 may operate in conjunction with physical components of the physical plant environment 15 to perform real-time control of the industrial process plant during run-time to thereby generate physical products from raw materials. Referring simultaneously to FIGS. 1, 2, and 3 to illustrate, the process controller 110 may be virtualized as the Virtual Node 30a, which has an architecture 52a. As such, instead of the physical process controller 110 executing its corresponding control modules or routines 118 during run-time, the Virtual Node 110/30a includes the control modules or routines 118 as its CBM 58a and executes the corresponding control modules or routines 118 during run-time, which may include sending and receiving signals to/from various field devices disposed within the physical environment 15 via the I/O Switch 25.

For example, during run-time of the industrial process plant 100, the virtual controller 110/30a may receive data generated by field device 129 via physical I/O device 115. In this example, physical I/O device 115 is represented in FIG. 1 by physical node PNg, field device 129 is represented in FIG. 1 by physical node PNh, and physical node 40b is an I/O hub device. Data payload generated by field device PNh is delivered via I/O device PNg to the I/O hub device 40b, which is a node of the virtual communication network 45. The I/O hub device 40b may publish, to the I/O Switch 25, the data payload that was generated by the field device PNh and published by I/O hub device 40b, to which the I/O Switch 25 has a subscription. In turn, the I/O Switch 25 may publish the payload data generated by field device PNh to the virtual controller 110/30a, whereupon the CBM 58a (e.g., the control modules/routines 118) of the virtual controller 110/30a may operate on the payload data generated by the field device PNh. The CBM 58a may generate output payload data that is to be delivered to another virtual or physical node via the virtual communication network 45.

In another example, during run-time of the industrial process plant 100, the virtual controller 110/30a may receive data generated by wireless field device 142a. In this example, physical wireless field device 142a is represented in FIG. 1 by physical node PNa, and the physical wireless gateway 168 is represented by PN 40c. Wireless gateway PN 40c receives payload data generated by wireless field device PNa. As PN 40c is a node of the virtual communication network 45, PN 40c publishes, to the I/O Switch 25, the payload data generated by the wireless field device PNa to which the I/O Switch 25 has a subscription. In turn, the I/O Switch 25 may publish the payload data generated by the field device PNa to a virtual node 30b, where the virtual node 30b is configured as a representation of an I/O device, such as the I/O device 115. The virtual I/O device 30b has subscribed to the payload data generated by the field device PNa and forwarded by the I/O Switch 25. As such, the virtual I/O device 30b obtains the payload data generated by the wireless field device PNa via its subscription, and publishes anew the obtained payload data generated by the field device PNa to the I/O Switch 25 for forwarding to appropriate subscribers. The I/O Switch 25 may in turn publish the obtained payload data of the field device PNa that was published by the virtual I/O device 30b to its respective subscribers, which (in this example) include the virtual controller 30a. Upon receipt of the payload data at the virtual controller 30a via its subscription thereto, the CBM 58*a* (e.g., the control modules/routines 118) of the virtual controller 30*a* may operate on the payload data generated by the wireless field device PN*a*. The CBM 58*a* may generate output payload data that is to be delivered to another virtual or physical node via the virtual communication network 45.

Virtualization of physical components of industrial process plants provide numerous benefits over industrial process plants that are entirely implemented using physical components. Virtualized components allow an industrial process plant to be flexibly scaled up and/or down in size and number of components with minimal changes to hardware footprint and decreased installation costs. As a virtual nodes may represent a physical device in its entirety or only a portion thereof, control may be easily scaled, e.g., across as many virtual nodes as needed. Additionally, the MPDSC platform 10 provides I/O flexibility via the abstraction of I/O, for example, so that controllers have less dependency on actual configured and downloaded I/O module assignments. That is, at least due to the I/O Switch 25, I/O binding decisions between physical I/O devices and controllers and field devices may be eliminated. Further, by using virtual physical components, software upgrades to the virtualized physical components is easily achieved. Still further, by using the MPDSC platform 10, simulation and on-line testing of behavior of physical components is also easily achieved and improved over currently known techniques.

Virtualization Management Node

Figure 5:
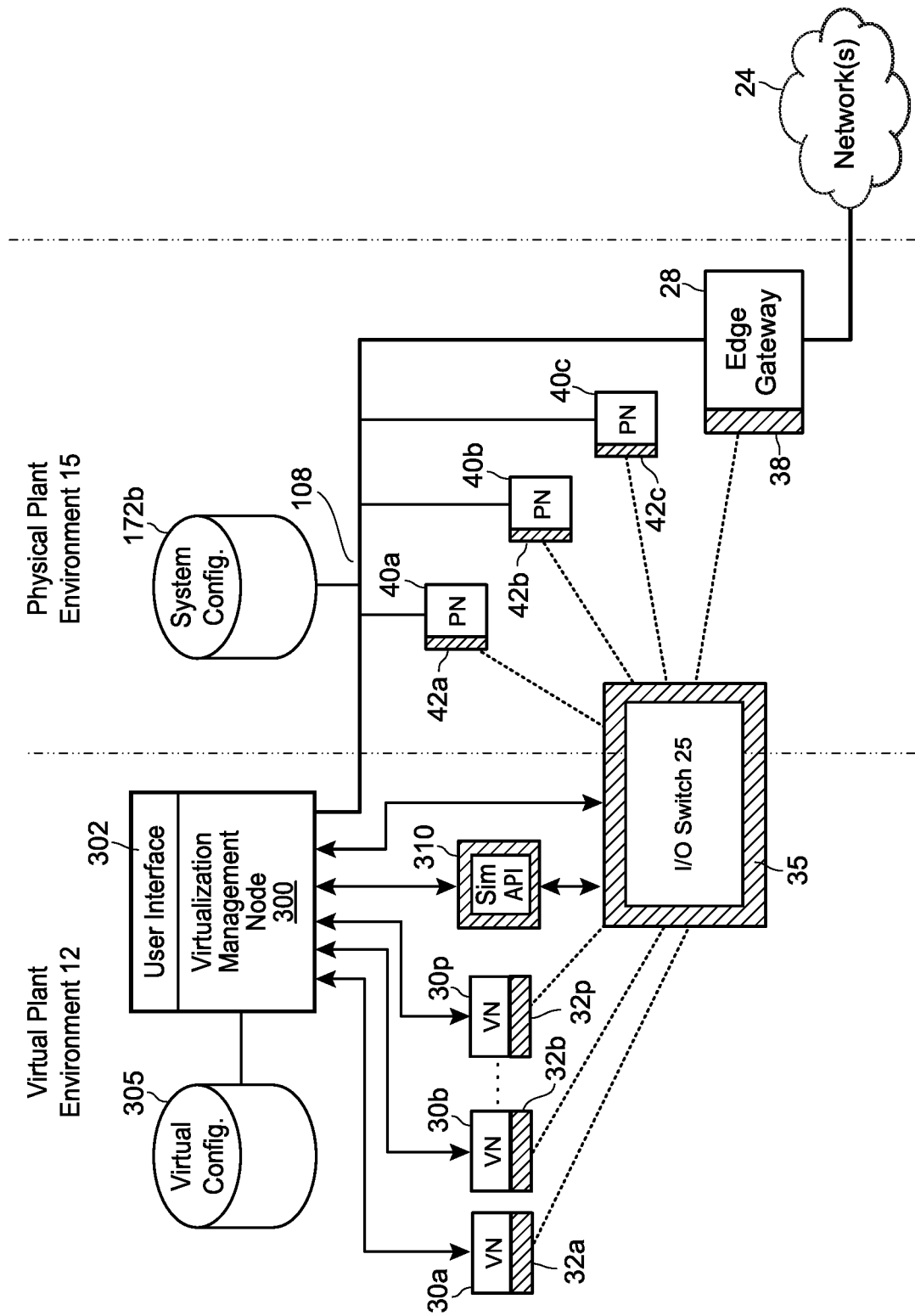
FIG. 5 is a block diagram illustrating an example virtualization management system via which at least portions of the MPDSC system of FIG. 1 may be configured and administered.

FIG. 5 is a block diagram illustrating an example architecture supporting the configuration, commissioning, management, and administration of the MPDSC system 10 of FIG. 1. For purposes of clarity, and not for limitation purposes, FIG. 5 is discussed herein with simultaneous reference to FIGS. 1-4. As shown in FIG. 5, a Virtualization Management Node 300 (which is interchangeably referred to herein as the "VMN 300" or the "Virtual Node 300") creates, configures, and manages virtualized components of the MPDSC system 10 such as the I/O Switch 25, various virtual nodes 30*x*, the virtual PIO subsystem 60, the publish/subscribe layers 32*x*, 35, 38, 42*x*, etc. The VMN 300 automatically performs at least some of the creation, configuration, and management of virtual components. Additionally or alternatively, the VMN 300 performs at least some of the creation, configuration, and management of the virtual components based on manual instructions, e.g., manual instructions received via a user interface 302 of the VMN 300, which may be a local or a remote user interface. Further, the Virtualization Management Node 300 drives and/or coordinates simulation activities of the virtual process environment 12, which may be performed with and/or without in-line user input during simulations, as is described in more detail below.

Virtual Component Configuration, Administration, and Management

In an embodiment, during the configuration and/or commissioning of the virtual environment 12 and components thereof, the VMN 300 accesses the system configuration database of the plant (e.g., the VMN 300 accesses the configuration database(s) 172*b* of the plant 100 via the data highway 108), and based on the obtained configuration, the VMN 300 determines the types and numbers of virtual nodes, virtual templates and/or subsystems, I/O switches, and/or other virtual components that would best support (or, that are desired to support) the plant configuration. The VMN 300 creates the various types and numbers of virtual nodes 30*x*, and configures the I/O Switch 25 and the virtual nodes 30*x* to communicate via the virtual communication network 45, e.g., via respective publish/subscribe layers 32*x* and, for some VNs 30*x*, via the virtual PIO subsystem 60. For some plant configurations, the VMN 300 may create and distribute instances of publish/subscribe layers 42*x* (and optionally, instances of the virtual PIO subsystem 60) to various physical components 40*x* of the physical plant environment 15. As such, the VMN 300 may create, configure, and administer any number of nodes 25, 28, 30*x*, 40*x* of the virtual communication network 45, which may include virtual components that operate in conjunction with physical components of the physical plant to perform real-time control and/or dynamic simulation.

The configuration of the virtual communication network 45 and its nodes 25, 28, 30*x*, 40*x* may be stored in the system configuration database 172*b*, and/or may be locally stored in a virtual environment configuration database 305. In some implementations, a master version of the configuration of the virtual plant environment 12 is stored in the system configuration database 172*b* (along with the configuration of the physical plant environment 15), and a copy of the master configuration of the virtual plant environment 12 is locally stored in the virtual environment configuration database 305. In some implementations, a master version of the configuration of the virtual plant environment 12 is stored in the virtual environment configuration database 305, and a copy of the master configuration of the virtual plant environment 12 is stored in the system configuration database 172*b* (along with the configuration of the physical plant environment 15). The VMN 300 coordinates change management and synchronization of data stored in the virtual environment configuration database 305 and related data stored in the system configuration database 172*b*.

While the plant 100 is performing operational process control during run-time of the process plant 100, the VMN 300 may monitor the I/O Switch 25, virtual nodes 30*x*, the virtual communication network 45 and any associated nodes (such as physical nodes 40*x*, 28) with respect to, for example, resource loading, resource availability, resource bandwidth, fault occurrence, and other performance issues of hardware and/or software resources provided by the physical computing platform supporting the virtual environment 12, e.g., platform of hardware computing devices supporting the virtual environment 12. Based on detected and/or predicted conditions, the VMN 300 may automatically perform mitigating actions during run-time operations, such as adjusting resource allocations, activating stand-by Virtual Nodes, creating and/or deleting Virtual Nodes, etc., e.g., for load-balancing, fault recovery, and other performance purposes. As an example, the VMN 300 may analyze performance bottlenecks and perform auto-leveling operations to mitigate any detected bottlenecks. For instance, the VMN 300 may perform auto-leveling at a process data level in response to the amount of virtual network traffic on the virtual communication network 45, and/or the VMN 300 may perform auto-leveling at a physical computing device level so that CPU and/or physical network utilization is balanced across the physical computing devices, physical data links, and/or physical networks on which the virtual environment 12 is implemented.

Administratively, the VMN 300 may perform the saving, snapshot, backup, migration, restoration, etc. of various virtual nodes, virtual templates and subsystems, and associated process data, and the VMN 300 may perform the saving, snapshot, backup, migration, restoration, etc. of the entire virtual environment 12 itself. In an embodiment, each administrative action performed by the VMN 300 may apply to an entirety of the logic simulated by subject Virtual Nodes (e.g., the entirety of the logic performed by collective set of CBMs 58 of the subject Virtual Nodes). For example, when taking and saving a snapshot of a virtual controller, the VMN 300 may not only save data that is received, operated on, generated by, and indicative of the virtual controller and its interconnections and operating states, but the VMN 300 may also save, as part of the snapshot, associated data of modules that are executed in conjunction with the virtual controller, even if such modules are hosted on other nodes and/or simulate other physical components. In another example, when taking and saving a snapshot of a virtual CIOC, the VMN 300 may save data corresponding to the virtual machine level of the virtual CIOC, and/or the VMN 300 may save process simulation values observed by the virtual CIOC.

Dynamic Simulation

As mentioned above, the MPDSC system 10 supports the dynamic simulation of the entire process plant 100 and/or of portions thereof. For example, the MPDSC system 10 provides for a real-time simulation, where the real-time simulation mirrors the run-time timing, values, and/or other behaviors of at least part of a corresponding physical component and/or physical operational process. As utilized herein, the terms "simulation" and "simulation run" are utilized interchangeably, and a simulation or simulation run is bounded. That is, each simulation or simulation run has a respective start and a respective finish, which may be defined as desired, e.g., based on a time, a parameter value, a state, a user command, and/or other criteria.

Additionally, the MPDSC system 10 provides for manipulation of simulations such as, for example, speeding up or slowing down the pace of simulation execution, pausing the simulation, inserting and/or modifying various values, changing initial conditions, etc. Simulations may be executed entirely within the virtual environment 12 of the MPDSC system 10, and/or simulations may be executed using one or more virtual or simulated components in conjunction with one or more physical components (e.g., a configuration of a controller simulated by a Virtual Node in the virtual environment 12 may communicate with a physical field device disposed in the physical environment 15 to test the simulated controller behavior). Generally speaking, the MPDSC system 10 provides a platform via which engineers and users may test and check out draft control strategies and draft operator displays, investigate process improvements, perform operator training, perform case studies, etc. The VMN 300 manages, coordinates, and drives simulation activities supported by the MPDSC system 10.

In particular, the VMN 300 creates, configures, and administrates virtual nodes 25, 30x and other virtual components 28, 32, 35, 38, 42x, 60 that simulate at least portions of the physical plant 100. Virtual nodes 25, 30x, that are utilized solely for simulation purposes (and not for run-time control purposes) are interchangeably referred to herein as "simulated nodes." For example, the VMN 300 may generate a mirror simulation system of the entire run-time control system as described by the plant configuration database 172b, e.g., by utilizing simulated nodes that simulate integral physical hardware components such as controllers 110, workstations 170a, and/or other physical devices and their corresponding network interconnections (in some implementations, simulating down to the MAC address level). In another example, the VMS 300 may generate respective simulations of one or more individual physical components, each of which may execute in a stand-alone mode or in conjunction with one or more other simulated, virtual, and/or physical components. For instance, the VMS 300 may generate, within the virtual environment 12, a virtual twin of a physical component that is currently operating within the physical environment 15, e.g., to test a new control configuration, an upgrade, a patch, etc. that is to be applied to the physical component. In another example, VMS 300 may generate a simulation of a MAC address level behavior of a particular physical component. In yet another example, the VMS 300 may generate a unitary (e.g., single) simulated node that simulates the real-time operating behavior of a group of physical devices, components, or nodes, such as a control loop or an operator display view.

With regard to configuring the types of data values utilized within the virtual 12 and physical 15 environments of the process control system 100, in an embodiment, a system process data definition (which may be configured via a system configuration application 172a and/or via the VMS 300) defines which data values (and/or types thereof) utilized within the process plant 100 are to be simulated, and the VMS 300 assigns respective Data Tags (e.g., identifiers) to the data values (and/or types thereof) that are to be simulated. For example, the VMS 300 may automatically assign Data Tags to at least some data values and/or data types that are to be simulated, and/or the VMS 300 may receive manually generated Data Tags of at least some data values and/or data types that are to be simulated, e.g., via the user interface 302. Assigned Data Tags of simulated data values and/or data types may be stored in the virtual environment configuration database 305 and/or in the system configuration database 172b.

Additionally, the VMN 300 drives and/or coordinates the simulations of the entire physical plant 100 and/or portions thereof. To this end, the virtual environment 12 provides a Simulator API (Application Programming Interface) 310 or other suitable access mechanism via which applications, such as the user interface 302, IT layer applications 21x, and/or third-party or external applications 22x may interface with the virtual environment 12 for the purposes of simulation. In an embodiment, the VMN 300 or other computing device within the virtual environment 12 hosts and/or exposes the Simulator API 310 to other applications.

As shown in FIG. 5, the Simulator API 310 communicates simulated data values (also interchangeably referred to herein as "simulation data values," "simulated values," and/or "simulation values") to and from the virtual environment 12 and simulated components included therein via the I/O Switch 25. Generally speaking, simulated run-time process data is delivered between 28, 30x, and the Simulator API 310 via the nodes' respective Pub/Sub layers. For example, simulated nodes 28, 30x, 310 may to publish run-time process data to one or more other simulated nodes 28, 30x, 310 via the I/O Switch 25, and simulated nodes 28, 30x, 310 may subscribe to run-time process data that is generated by one or more other simulated nodes 28, 30x, 310 and received via the I/O switch 25. On the other hand, in an embodiment, simulated data values that are not run-time process data (e.g., data values that are configurable and that are typically assigned during down-load time in the physical environment 15) may be delivered between simulated nodes 28, 30x, 310 on an as-changed basis, e.g., only when respective values of the data change.

The Simulator API 310 is configured with names, data tags, identifiers, data definitions, channel data, etc. of simulated components within the virtual environment 12 (e.g., based on data stored in the virtual configuration database 305), and the Simulator API 310 is also configured to communicate using one or more industrial and/or general purpose communication/data protocols, which may be a standardized protocol, e.g., OPC, Ethernet, IPv6, etc. As such, the Simulator API 310 serves as a data delivery and transport mechanism between simulated components within the virtual environment 12 and other applications 302, 21x, 22x that are consumers and/or providers of simulation data and that utilize the one or more industrial and/or general purpose communication/data protocols. For example, a third-party simulation application may utilize the Simulator API 310 to inject test values for use by a simulated component, change the initial conditions of a simulation run, etc.

Additionally or alternatively, the Simulator API 310 handles simulation commands provided via the user interface 302 and/or by other applications 21x, 22x. For example, the Simulator API 310 may receive simulation commands to speed up and/or slow down the pace of module execution (at least some of which is simulated within the virtual environment 12) and/or to speed up and/or slow down the pace of I/O processing, and may drive the timing and the actions of associated simulated nodes 30x, 28 and/or of the virtual communication network 45 accordingly. In another example, the Simulator API 310 may receive simulation commands to inject and/or change various data values during the simulation. Further, the Simulator API 310 may receive administrative simulation commands to, for example, save a snapshot, retrieve a saved snapshot, restore from saved data, etc. and may perform the corresponding action in response. For example, the Simulator API 310 may receive and respond to simulation commands to save, retrieve, restore, etc. a simulation of the entire process plant 100 (e.g., to/from the virtual environment configuration database 305 and/or from to/from the system configuration database 172b) as well as to save, retrieve, restore, etc. a simulation of one or more nodes or components of the process plant 100.

Generally speaking, the Simulation API 310 is stateful. That is, the Simulation API 310 is aware of various states of the simulation and components (e.g., of virtual, physical, and/or simulated devices; virtual, physical, and/or simulated modules; other types of virtual, physical, and/or simulated components; a process that is being at least partially simulated by the simulation; a state of the overall simulation; etc.) associated therewith as the simulation executes, and responds to the received commands based on the various states. For example, in responding to a Save command, the Simulation API 310 may save process data in conjunction with data indicative of associated components' states. In another example, when simulating a modified control module executing within a controller for testing purposes, the Simulation API 310 may allow a user to change the state of an associated module to determine how the modified control module would respond to different states of the associated module.

Figure 6:
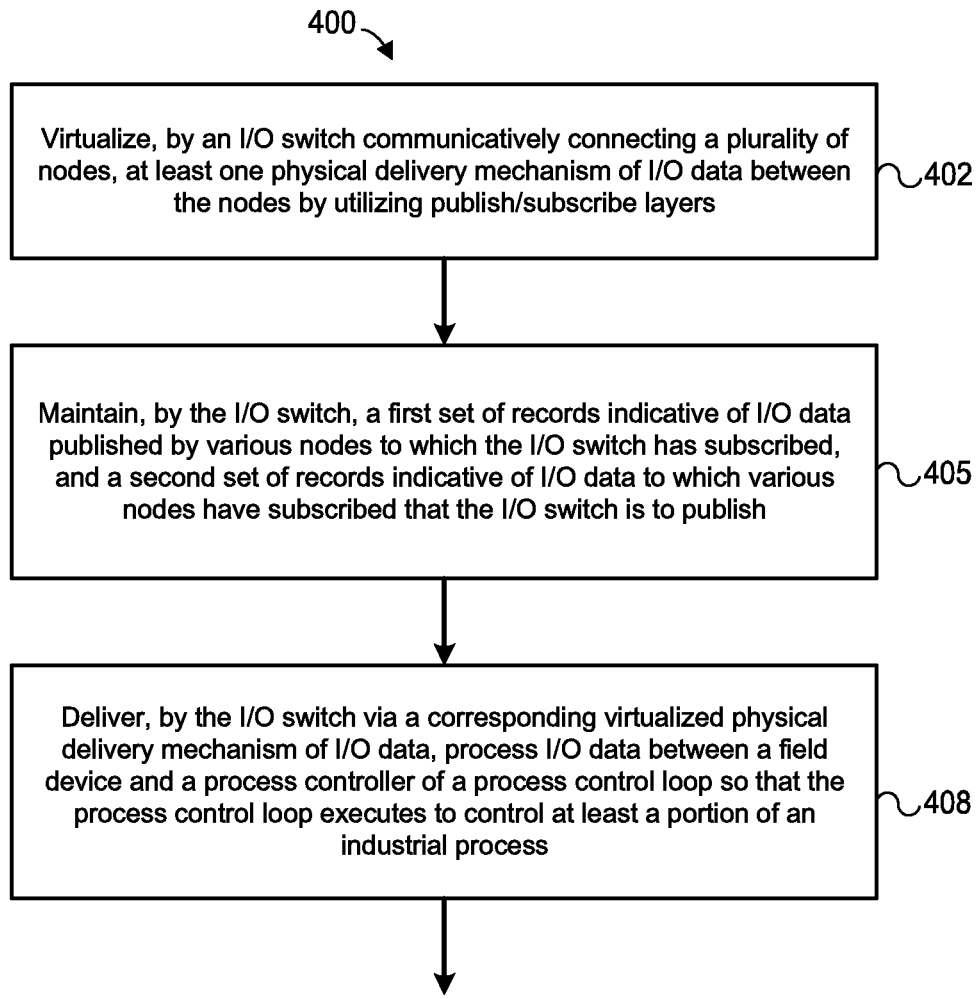
FIG. 6 is a flow diagram of an example method of controlling an industrial process of an industrial process plant.

FIG. 6 is a flow diagram of an example method of controlling an industrial process of an industrial process plant. At a least a portion of embodiments of the method 400 may be performed by one or more portions of the multi-purpose dynamic simulation and run-time industrial or process control (MPDSC) system or platform 10 of FIG. 1 and/or any one or more components thereof, such as by the I/O switch 25 of FIG. 1; and/or by one or more portions of embodiments of the arrangement 200 of I/O Switches of FIG. 4. At a least a portion of embodiments of the method 400 may be performed in conjunction with one or more portions of the multi-purpose dynamic simulation and run-time industrial or process control (MPDSC) system or platform 10 of FIG. 1 and/or any one or more components thereof; by one or more portions of embodiments of the virtual nodes 52a, 52b of FIG. 2; by one or more portions of embodiments of the physical plant environment 100 of FIG. 3 and/or any one or more components thereof; by one or more portions of embodiments of the arrangement 200 of I/O Switches of FIG. 4; and/or by one or more portions of embodiments of the Virtualization Management Node 300 of FIG. 5. For ease of illustration, and not for limitation purposes, the method 400 is described herein with simultaneous reference to portions of FIGS. 1-5. Further, the method 400 may include more, fewer, and/or alternate steps other than those described herein, in embodiments.

As illustrated in FIG. 6, at a block 402, the method 400 includes virtualizing, by an I/O switch (such as the I/O switch 25 of FIG. 1), at least one physical delivery mechanism of I/O data between a plurality of nodes of a process control system, where the I/O switch communicatively connects the plurality of nodes. Generally speaking, and in a manner similar to as discussed elsewhere herein, virtualizing the at least one I/O data physical delivery mechanism includes virtualizing one or more types of I/O hardware, such as different types of I/O cards, different types of I/O devices, different types and/or components of I/O electronic marshalling cabinets and/or systems, and/or other types of I/O hardware. As such, with the method 400, the number of actual, physical I/O devices and/or other types of I/O hardware that are needed to support a process control system (and the corresponding physical footprints, wirings, testing, maintenance, configurations, diagnostics, etc. of the physical I/O hardware) is greatly decreased from process control systems that do not utilize the method 400 and instead primarily rely on physical I/O devices and/or other types of physical I/O hardware to deliver I/O data between senders and receivers.

Virtualizing the one or more physical delivery I/O data delivery mechanisms (block 402) may include making use of respective publish/subscribe layers that are associated with and/or included in the plurality of nodes as well as a publish/subscribe layer of the I/O switch itself. That is, each node (which may be a sender and/or a receiver of I/O data) that is communicatively connected to the I/O switch may subscribe to I/O data that is published by the I/O switch, and may publish data that is generated and/or otherwise provided by the each node to the I/O switch via an associated publish/subscribe layer. The publish/subscribe layer associated with a particular node may be included in the particular node, or may be included in an intervening device, such as in a manner described elsewhere herein. The I/O switch includes a respective publish/subscribe layer via which node-published I/O data is received, and via which the I/O switch publishes I/O data that is subscribed to by other nodes. The respective publish/subscribe layers of the I/O switch and associated with the plurality of nodes typically utilize a packet protocol to transmit and receive I/O data, e.g., via publications and subscriptions, such as in a manner described elsewhere herein. Of course, other types of protocols that support publishing and subscribing may be additionally or alternatively utilized by the respective publish/subscribe layers, in embodiments.

At an optional block 405, the method 400 may include maintaining, by the I/O switch, a first set of records indicative of I/O data published by various nodes and to which the I/O switch has subscribed, and respective publishing nodes of each published I/O data. At the optional block 405, the method 400 also includes maintaining, by the I/O switch, a second set of records indicative of I/O data to which various nodes (which may be a different set of nodes than those referenced in the first set of records) have subscribed, and the corresponding subscribing nodes to which the I/O switch is to publish to the subscribed-to I/O data. Generally, but not necessarily, each specific I/O data indicated in the second set of records as being subscribed-to by one or more subscriber nodes is also indicated in the first set of records as being published by a respective publishing node. The I/O switch utilizes the sets of records to switch, forward, route, or otherwise deliver I/O data between sending nodes and receiving nodes. The I/O switch may update one or more of the sets of records based on, for example, an acceptance of a request of a node to subscribe to a particular I/O data, a change in a subscription and/or a publication of a node, etc.

In an embodiment, the I/O switch may reference the various I/O data, the various I/O types, the various subscribing nodes and/or devices, and/or the various publishing nodes and/or devices (e.g., within the sets of records, as received via subscriptions of the I/O switch, and/or as published by the I/O switch) by respective data tags or identifiers that are unique at least within the I/O switch 25. In some implementations, the tags and/or identifiers utilized by the I/O switch may be unique within an MPDSC platform 10, and/or the tags and/or identifiers utilized by the I/O switch may be unique across a process control system 100. Generally, the unique tags/identifiers utilized by the I/O switch may be generated (e.g., by a Virtualization Management Node 300 associated with the I/O switch 25) based on identifiers and/or tags that are stored in a system configuration database of the process control system (e.g., the configuration database(s) 172b), such as in a manner described above.

For some sending and/or receiving nodes, virtualizing the one or more physical delivery I/O data delivery mechanisms (block 402) includes utilizing a respective virtual PIO subsystem included in the I/O switch. For example, in some embodiments, the I/O switch may include one or more virtual PIO subsystems, each of which may be similar to the virtual PIO subsystem 60 described in FIG. 2 with respect to the virtual node 52a. Generally speaking, each of the one or more virtual PIO subsystems of the I/O switch may virtualize or simulate a different native, physical PIO delivery mechanism which is utilized by one or more sending nodes and/or receiving nodes. As such, the I/O switch may employ a respective virtual PIO subsystem to communicate I/O process values and events to/from various sending and/or receiving nodes via their native I/O, e.g., as though the I/O process values and events were originating from/being delivered to physical I/O hardware. In an illustrative example, a particular sending node may send, to the I/O switch, physical I/O data by utilizing native physical I/O hardware and/or corresponding native data and/or protocol formats. The I/O switch may utilize a corresponding virtual PIO subsystem to convert the data received from the particular sending node into the protocol utilized by the publish/subscribe layers of the I/O switch, and may publish the received data (or an indication thereof) to its subscribers. In another illustrative example, the I/O switch may receive I/O data to which the I/O switch has subscribed via the I/O publish/subscribe layer of the I/O switch, and may utilize a respective virtual PIO subsystem to convert the received I/O data into a native format of a recipient node or device, and deliver (e.g., transmit or send) the converted I/O data to the recipient node or device. Consequently, for some types of I/O data that are switched by the I/O switch to/from physical nodes or devices, the I/O switch utilizes respective communication interfaces to respective physical communication links and/or networks to which the physical nodes or devices are communicatively connected. The respective communication interfaces may include hardware (e.g., physical) interfaces and/or software (e.g., protocol, data typing, etc.) interfaces. At least some of the respective communication interfaces may be included in the I/O switch, in embodiments. In some embodiments, one or more of the respective communication interfaces may be included in a respective intervening node disposed between the I/O switch and a corresponding sending or receiving physical node.

As such, in view of the above, the I/O switch is able to easily switch I/O data between different types of physical nodes and/or virtual nodes, e.g., by utilizing respective publish/subscribe layers for some, and by utilizing respective publish/subscribe layers and a respective virtual PIO subsystem for others. As such, the I/O switch is able to switch, forward, and/or route I/O data between different types of virtual nodes/devices and/or different physical nodes/devices, e.g., by utilizing publish/subscribe layers to simulate and/or virtualize native physical I/O delivery mechanisms, and/or by utilizing publish/subscribe layers in conjunction with respective virtual PIO subsystems to simulate and/or virtualize native physical I/O delivery mechanisms.

Returning to FIG. 4, at a block 405, the method 400 includes brokering, switching, forwarding, or otherwise delivering, by the I/O switch and via a corresponding virtualized physical delivery mechanism of I/O data, process I/O data between a field device and a process controller that are included in a process control loop of the process control system, (e.g., while the process control loop is executing during run-time operations of an industrial process plant to control at least a portion of an industrial process) so that the process control loop executes in real-time to control the at least the portion so the process. Generally speaking, the field device is disposed in a physical environment of an industrial process plant and performs some type of physical function. The controller may be a physical controller which is also disposed in the physical environment of the industrial process plant, or the controller may be virtual controller which is disposed in a virtual environment of the industrial process plant. The I/O switch may utilize the corresponding virtualized physical delivery mechanism to deliver I/O data between the field device and the controller during the run-time execution of the process control loop. In an example, during the run-time execution of the process control loop, the I/O switch receives data generated by the field device during its run-time operations, and delivers or forwards the data to the controller so that the component behavior module executing at the controller is able to operate on the content of the field device-generated data to thereby generate and transmit a control signal to another device or node of the process control system (e.g., another controller (whether virtual or physical), another field device (whether virtual or physical), etc.), to thereby control at least a portion of the industrial process.

To deliver the process I/O data between the field device and the controller, the I/O switch may involve the publish/subscribe layer associated with the field device (which may be included in the field device or in an intervening device), the publish/subscribe layer of the I/O switch, and the publish/subscribe layer associated with the controller (which may be included in the controller or in an intervening device), e.g., in a manner such as described elsewhere herein. For some types of field device and/or controllers, the I/O switch may additionally utilize a respective virtual PIO subsystem to receive and/send the I/O data, e.g., in a manner such as described elsewhere herein. For example, the respective virtual PIO subsystem may be included in the I/O switch, or the respective virtual PIO subsystem may be included in the field device (or a respective intervening device) or in the controller (or a respective intervening device).

The I/O switch may subscribe to various data generated by the field device (which may be provided to the I/O switch from the field device or from a respective intervening device), and the I/O switch may subscribe to various data generated by the controller (which may be provided to the I/O switch from the controller or from a respective intervening device). Similarly, the I/O switch may publish various data generated/provided by the controller (or its respective intervening device) to which the field device (or its respective intervening device) has subscribed, and the I/O switch may publish various data generated/provided by the field device (or its respective intervening device) to which the controller (or its respective intervening device) has subscribed.

Further, although the method 400 refers to the I/O switch delivering data between a field device and a controller at the block 408, it is understood that the method 400 may easily be adapted to deliver data between any two nodes that are communicatively connected via the I/O switch, irrespective whether or not either of the nodes is a physical node and/or whether or not either of the nodes is a virtual node. Indeed, the method 400 may be utilized to deliver I/O data between multiple pairs of nodes. For example, in some embodiments, the method 400 may include virtualizing multiple physical I/O data delivery mechanisms of a process control system to deliver I/O data between multiple pairs of nodes. In some embodiments, the method 400 may include virtualizing all possible physical I/O data delivery mechanisms of a process control system to deliver I/O data between multiple pairs of nodes. The adaptability and flexibility of the method 400 and, indeed, of the MPDSC 10 described herein allows for the ease of migration of a legacy or existing, physical industrial process plant into a virtual environment. Additionally or alternatively, the adaptability and flexibility of the method 400 and of the MPDSC 10 allows for the ease of expansion of a process control plant by significantly decreasing the need for adding I/O hardware.

Thus, in view of the above, the novel Multi-Purpose platform for Dynamic Simulation and run-time Control platform 10 provides numerous benefits and advantages over known process control systems. For example, as the MPDSC platform 10 supports both simulation and run-time control via virtual components, testing of changes (e.g., upgrades, patches, etc.) may be performed in the virtual environment 12 via a simulated component, and upon satisfactory checkout, the simulated component may be easily activated as a virtual component of the process plant 100 (e.g., "Load, Evaluate, Go," bumpless or warm switchovers, etc.). As such, switchovers of simulated components to run-time components is more easily accomplished, and downtime due to upgrades, patches, and planned maintenance is reduced. Moreover, the amount of resources that are utilized to provide virtualized hot spares of various components and bring the virtualized hot spares on-line during failure or error scenarios is also greatly reduced.

Further, the provision of run-time virtual components by the MPDS platform 10 allows for independence between hardware and software within the plant 100. For example, controller software that is utilized during run-time of the process control system 100 may be upgraded in run-time-virtual controllers without needing to upgrade or change any physical controller hardware. Similarly, due to the hardware/software independence, the MPDS platform 10 allows for hardware of the process plant 100 to be upgraded independently of software upgrades.

Still, the provision of run-time virtual components and the administration and/or management thereof (e.g., via the VMS 300 of the MPDSC platform 10) also allows for easy and less costly system scalability, as additional virtual components may be easily implemented within the virtual environment 12 without needing to pay for, install, test, commission, and check out different physical hardware components and required cabinets, wiring, etc. Indeed, when additional virtual components are needed to support the system 100, virtual components may be created as needed up to the processing and/or memory limits of the physical computing devices and/or hardware on which the virtual environment 12 is implemented, after which additional physical computing devices and/or hardware may simply be added thereto.

The virtual environment 12 provided by the MPDS platform 10 enables the creation of various components' digital twins and/or virtual simulation of the entire process plant 100, e.g., for testing, hot spares, upgrades, patches, planned maintenance, and/or other purposes. Digital twins (e.g., of particular components and of the entire process plant 100) may be updated in lock-step with updates to their respective particular physical component(s). That is, state information may be passed, via the MPDSC platform 10, from physical node(s) to virtual node(s). Indeed, the MPDSC platform 10 provides enhanced on-line testing of changes and/or different scenarios (e.g., "what-if" scenarios), and, in some situations, in conjunction with run-time virtual and/or physical components of the process plant 100. Due to the common MPDS platform 10 (and in particular, the virtual environment 12 of the MPDS platform 10) being architected and utilized for both simulation and run-time control purposes, off-simulation is easily accomplished without any configuration changes.

Still further, as the MPDS platform 10 abstracts the I/O of the process plant 100 away from being specifically directly associated with particular hardware, I/O configuration within the plant 100 is more flexible and is easily changed and adapted not only during run-time, but also during upgrades, maintenance, failures, and the like. Significantly, communicative connections between I/O devices and other components (e.g., CIOCs and controllers) are no longer limited by physical ports that are available on physical I/O devices. As I/O is abstracted within the MPDS platform 10, any number of communicative connections between a virtual I/O device and other components are logically possible, up to the processing and/or memory limits of the physical computing devices and/or hardware on which the virtual environment 12 is implemented, after which additional physical computing devices and/or hardware may simply be added thereto. Similarly, due to the abstraction of I/O within the MPDS platform 10, and control modules and/or other CBMs 58 may be assigned to any virtual host device or component without any concern for I/O location and/or loading of the host device or component, as is necessary when utilizing physical host devices or components. That is, as previously discussed, virtual components (whether utilized for simulation or for run-time control purposes) may operate utilizing I/O from physical components or from other virtual components. As such, the MPDS platform 10 is able to abstract (e.g., by utilizing the I/O Switch 25) redundancy, retry, and other mechanisms that are presently tied to specific implementations within currently known techniques so that the abstractions may be utilized across in multiple, different types of applications, scenarios, and implementations, e.g., with selected customization and specialization of various abstractions for particular implementations and/or applications. Consequently, the MPDS platform 10 is able to support many more numbers and types of I/O systems (as compared to currently known techniques) in a consistent and easily scalable manner.

When implemented in software, any of the applications, services, virtual devices, vertical machines, virtual entities, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method of controlling an industrial process of an industrial process plant, the method comprising:
   virtualizing, by an input/output (I/O) switch communicatively disposed between a plurality of nodes of the industrial process plant, at least one physical delivery mechanism of I/O data between the plurality of nodes via publish/subscribe layers corresponding to the plurality of nodes and the I/O switch,
      the I/O switch included in a process control system of the industrial process plant; and
      the plurality of nodes including a field device disposed in a physical environment of the industrial process plant and a process controller, the field device and the process controller included in a process control loop of the process control system that executes during run-time operations of the industrial process plant to control at least a portion of the industrial process;
   maintaining, by the I/O switch, a set of records identifying the process controller as a publisher of a control signal and identifying the field device as a subscriber to publications of the control signal; and
   delivering, by the I/O switch based on the set of records and via a corresponding virtualized physical delivery mechanism utilizing the publish/subscribe layers corresponding to the field device, the process controller, and the I/O switch, the control signal from the process controller to the field device to thereby control the at least the portion of the industrial process, including:
      obtaining, by the I/O switch in accordance with a subscription of the I/O switch to publications of the control signal generated by the process controller, a first publication of the control signal; and
      based on the obtained first publication and the set of records, publishing, by the I/O switch, a second publication indicating the control signal, thereby causing the field device to obtain, based on a subscription of the field device to publications, by the I/O switch, that are indicative of the control signal, the control signal via the second publication and thereby control the at least the portion of the industrial process.

2. The method of claim 1, wherein the process controller is a physical process controller disposed in the physical environment of the industrial process plant.

3. The method of claim 1, wherein the process controller is a virtual process controller disposed in a virtual environment of the industrial process plant, and the I/O switch communicatively connects the virtual environment of the industrial process plant with the physical environment of the industrial process plant.

4. The method of claim 1, wherein utilizing the publish/subscribe layers that correspond to the field device, the process controller, and the I/O switch includes utilizing a packet protocol.

5. The method of claim 1, further comprising utilizing the publish/subscribe layers corresponding to the field device, the process controller, and the I/O switch to deliver process I/O data between the field device and the process controller, including:
   receiving, at the I/O switch, published first data via the publish/subscribe layer of the I/O switch and based on a subscription of the I/O switch to the published first data, the published first data indicating process data generated by the field device during the execution of the process control loop; and
   publishing, by the I/O switch via the publish/subscribe layer of the I/O switch, second data indicative of the published first data, thereby causing the process controller to, during the execution of the process control loop:
      receive, via the respective publish/subscribe layer of the process controller and based on a corresponding subscription, the published second data or data indicative of the published second data;
      generate the control signal based on the process data generated by the field device and indicated by the published second data; and
      publish the control signal to modify the control of the at least the portion of the industrial process.

6. The method of claim 5, wherein controlling, during the run-time operations of the industrial process plant, the at least the portion of the industrial process comprises delivering the process I/O data between the field device and the process controller of the process control within a time interval of less than 500 microseconds.

7. The method of claim 6, wherein controlling, during the run-time operations of the industrial process plant, the at least the portion of the industrial process comprises delivering the process I/O data between the field device and the process controller of the process control within a time interval of less than 100 microseconds.

8. The method of claim 1, wherein maintaining the set of records includes:
   maintaining, by the I/O switch, a first set of records indicative of respective I/O data published by each node of a first at least a subset of the plurality of nodes and to which the I/O switch has subscribed, the first at least the subset of the plurality of nodes including the process controller; and maintaining, by the I/O switch, a second set of records indicative of respective I/O data to which each node of a second at least a subset of the plurality of nodes has subscribed, the second at least the subset of the plurality of nodes including the field device or an intervening node communicatively disposed between the I/O switch and the field device; and wherein delivering, by the I/O switch, the control signal from the process controller to the field device is based on the first set of records and the second set of records maintained by the I/O switch.

9. The method of claim 8, further comprising accepting, by the I/O switch, a request of a particular node included in the second at least the subset of the plurality of nodes to subscribe to particular I/O data, and storing a particular record in the second set of records based on the accepted request.

10. The method of claim 8, wherein the I/O data indicated in the second set of records is indicated in the first set of records.

11. The method of claim 8, further comprising updating at least one of the first set of records or the second set of records based on changes to subscriptions.

12. The method of claim 8, wherein each of the I/O data indicated by the first set of records and the I/O data indicated by the second set of records is respectively identified at the I/O switch by a unique tag, the unique tag identifying the each I/O data, and the unique tag defined based on a configuration of the industrial process plant.

13. The method of claim 1, wherein at least a portion of the I/O switch comprises computer-executable instructions stored on one or more memories of one or more computing devices.

14. The method of claim 13, wherein the at least the portion of the I/O switch is a first at least a portion of the I/O switch, and at least a second portion of the I/O switch comprises the one or more computing devices.

15. The method of claim 13, wherein at least some of the at least the portion of the I/O switch is implemented via virtualization, the virtualization of the I/O switch including a virtual machine, a container, or another type of virtualization.

16. The method of claim 1, wherein the I/O switch is a first I/O switch included in the process control system of the industrial process plant, and the method further comprises utilizing the publish/subscribe layers that respectively correspond to the field device, the process controller, and the first I/O switch to deliver process I/O data between the field device and the process controller, including:

receiving, via the publish/subscribe layer of the first I/O switch, first data that is published by the publish/subscribe layer of the field device, the published first data indicative of process data generated by the field device while the process control loop is executing during the run-time operations of the industrial process plant;

publishing, via the publish/subscribe layer of the first I/O switch, second data indicative of the first data, thereby causing a second I/O switch that is included in the process control system and that has subscribed to publications of the second data to receive the published second data and forward third data indicative of the published second data to the process controller included in the process control loop.

17. The method of claim 1, wherein:

virtualizing, by the I/O switch, the at least one physical delivery mechanism of the I/O data between the plurality of nodes via the publish/subscribe layers corresponding to the plurality of nodes and the I/O switch comprises virtualizing, by the I/O switch, multiple physical delivery mechanisms of the I/O data.

18. The method of claim 17, wherein the virtualized multiple different physical delivery mechanisms are utilized by different recipient nodes of the plurality of nodes, the different recipient nodes including different types of process controllers.

19. The method of claim 18, wherein at least one of: the different types of process controllers include different types of virtual process controllers, or the different types of process controllers include different types of physical process controllers.

20. The method of claim 17, wherein virtualizing the multiple physical delivery mechanisms of the I/O data includes virtualizing multiple types of I/O hardware, the multiple types of I/O hardware including at least one of: one or more types of physical I/O cards, one or more types of physical I/O devices, or one or more components of electronic marshalling systems.

21. A system of an industrial process plant, the system comprising:

an input/output (I/O) switch included in a process control system of the industrial process plant, the I/O switch communicatively connecting a plurality of nodes of the process control system, and the I/O switch virtualizing at least one physical delivery mechanism of I/O data between the plurality of nodes by utilizing publish/subscribe layers corresponding to the plurality of nodes and the I/O switch, the process control system further including a process control loop comprising a field device disposed in a physical environment of the industrial process plant and a process controller, the field device and the process controller included in the plurality of nodes communicatively connected via the I/O switch, and the process control loop executing during run-time operations of the industrial process plant to control at least a portion of an industrial process by utilizing a corresponding virtualized physical delivery mechanism provided by the I/O switch to deliver control signals from the process controller to the field device, wherein:

the I/O switch maintains a set of records identifying the process controller as a publisher of a control signal and identifying the field device as a subscriber to publications of the control signal;

the I/O switch obtains, in accordance with the set of records and a subscription of the I/O switch to publications of the control signal generated by the process controller, a first publication of the control signal; and the I/O switch publishes, based on the obtained first publication and the set of records, a second publication indicating the control signal, thereby causing the field device to obtain, based on a subscription of the field device to publications, by the I/O switch, that are indicative of the control signal, the control signal via the second publication and thereby control the at least the portion of the industrial process.

22. The system of claim 21, wherein:

the I/O switch includes a publish/subscribe layer via which the I/O switch receives published I/O data to which the I/O switch has subscribed and via which the I/O switch publishes I/O data to which one or more of the plurality of nodes has subscribed;

each node of the plurality of nodes is associated with a respective publish/subscribe layer via which I/O data generated by the each node is published to the I/O switch and via which I/O data that has been published by the I/O switch and to which the each node has subscribed is received at the each node.

23. The system of claim 22, wherein the I/O switch is at least partially disposed in a virtual environment of the industrial process plant, the plurality of nodes includes one or more virtual nodes disposed within the virtual environment of the industrial process plant, and each virtual node of the one or more virtual nodes includes the respective publish/subscribe layer associated with the each virtual node.

24. The system of claim 23, wherein each virtual node of at least some of the one or more virtual nodes further includes a respective PIO subsystem layer disposed between the respective publish/subscribe layer of the each virtual node and a component behavior module of the each virtual node, the respective PIO subsystem simulating a physical data delivery mechanism native to the component behavior module of the each virtual node.

25. The system of claim 23, wherein the each virtual node is one of: a virtual process controller, a virtual safety controller; a virtual safety logic solver; a virtual I/O card, device, or node; a virtual wireless device; a virtual Ethernet device; a virtual operator workstation; a virtual user interface device; a virtual tool; a virtual gateway; a virtual electronic marshalling cabinet or system; or a virtualization of another type of physical device or component disposed within a physical environment of the industrial process plant.

26. The system of claim 22, wherein:
the plurality of nodes includes a specific node that is disposed in the physical environment of the industrial process plant and communicatively connected with the I/O switch via an intervening node disposed between the I/O switch and the specific node;
the respective publish/subscribe layer associated with the specific node is included in the intervening node; and
at least one of:
(a) the intervening node publishes, to the I/O switch via the publish/subscribe layer of the intervening node, data payload generated by the specific node; or
(b) the intervening node receives, from the I/O switch via the publish/subscribe layer of the intervening node, data published by the I/O switch and subscribed to by the intervening node; and transmits, to the specific node, payload data indicated by the published data received by the intervening node.

27. The system of claim 26, wherein the intervening node communicates with the specific node using a physical communication link or network disposed in the physical environment of the industrial process plant.

28. The system of claim 22, wherein:
the I/O switch further includes one or more process input/output (PIO) subsystems, each of which simulates a different physical data delivery mechanism that is native to a respective one or more component behavior modules executing on at least some of the plurality of nodes; and
the I/O switch utilizes both the publish/subscribe layer of the I/O switch and a respective PIO subsystem to deliver I/O data between the I/O switch and the respective one or more component behavior modules executing on the at least some of the plurality of nodes.

29. The system of claim 21, wherein at least a first portion of the plurality of nodes includes a set of virtual nodes of a virtual communications network disposed in a virtual environment of the industrial process plant, and the I/O switch further includes an interface to a virtual communications network via which real-time I/O data is delivered between the I/O switch and each virtual node of the set of virtual nodes.

30. The system of claim 21, wherein at least a second portion of the plurality of nodes includes a set of physical nodes disposed in the physical environment of the industrial process plant, and the I/O switch includes respective communication interfaces to one or more physical communication networks disposed in the physical environment of the industrial process plant and to which the one or more physical nodes are communicatively connected.

31. The system of claim 30, wherein the set of physical nodes includes at least one of: the process controller or another process controller; a safety controller; a safety logic solver; an I/O node, card, or device; a wireless device; an Ethernet device; an operator workstation; a user interface device; a tool; a gateway; an electronic marshalling cabinet; a network connection; or another type of physical device or component disposed within the physical environment of the industrial process plant.

32. The system of claim 30, wherein each respective communication interface to the one or more physical communication networks generates a conversion, of real-time I/O processed by the I/O switch, between a publish/subscribe protocol utilized by the I/O switch and a respective physical interface and a respective communications protocol corresponding to at least some of the one or more physical communication networks.

33. The system of claim 21, wherein:
the set of records includes a first set of records and a second set of records;
the first set of records is indicative of respective I/O data respectively published by each node of a first at least a subset of the plurality of nodes and to which the I/O switch has subscribed, the first at least the subset of the plurality of nodes including the field device;
the second set of records is indicative of respective I/O data to which each node of a second at least a subset of the plurality of nodes has subscribed, the second at least the subset of the plurality of nodes including the process controller or an intervening node communicatively disposed between the I/O switch and the process controller; and
the I/O switch switches real-time I/O data between pairs of nodes included in the plurality of nodes based on the first set of records and the second set of records.

34. The system of claim 33, wherein each I/O data indicated in the second set of records is indicated in the first set of records.

35. The system of claim 33, wherein each I/O data indicated in the first set of records and in the second set of records is identified via a unique identifier, the unique identifier assigned to the each I/O data based on a configuration of the process control system.

36. The system of claim 33, wherein the I/O switch updates at least one of the first set of records or the second set of records based on changes to subscriptions.

37. The system of claim 21, wherein at least a portion of the I/O switch comprises computer-executable instructions stored on one or more memories of one or more computing devices.

38. The system of claim 37, wherein the at least the portion of the I/O switch is a first at least a portion of the I/O switch, and at least a second portion of the I/O switch comprises the one or more computing devices.

39. The system of claim 37, wherein at least some of the at least the portion of the I/O switch is implemented via virtualization, the virtualization of the I/O switch including a virtual machine, a container, or another type of virtualization.

40. The system of claim 21, wherein:
the I/O switch is a first I/O switch included in the process control system of the industrial process plant;
the process control system further comprises a second I/O switch;
I/O data generated by a first node of the plurality of nodes is published via a publish/subscribe layer associated with the first node and subscribed to by the first I/O switch;
second data indicative of the I/O data generated by the first node and subscribed to by the first I/O switch is published via a publish/subscribe layer of the first I/O switch and subscribed to by the second I/O switch; and
third data indicative of the second data published by the first I/O switch and subscribed to by the second I/O switch is published via a publish/subscribe layer of the second I/O switch and subscribed to by a second node of the plurality of nodes.

41. The system of claim 21, wherein the system includes multiple I/O switches having an interconnected topology for delivering I/O data between respective nodes that are communicatively connected to different ones of the multiple I/O switches.

42. The system of claim 41, wherein the interconnected topology includes at least one of: a hub-and-spoke topology, a star topology, a ring topology, a tree topology, or another type of interconnected topology.

43. The system of claim 21, wherein the virtualized at least one physical delivery mechanism of I/O data comprises different virtualized physical delivery mechanisms of I/O data.

44. The system of claim 43, wherein the different virtualized physical delivery mechanisms are utilized to deliver I/O data to/from different nodes of the plurality of nodes, the different nodes including different types of process controllers.

45. The system of claim 44, wherein at least one of: the different types of process controllers include different types of virtual process controllers, or the different types of process controllers include different types of physical process controllers.

46. The system of claim 43, wherein the different virtualized physical delivery mechanisms of I/O data includes different virtualized types of I/O hardware, the different virtualized types of I/O hardware including at least one of: one or more types of physical I/O cards, one or more types of physical I/O devices, or one or more components of electronic marshalling systems.

* * * * *